United States Patent
Wang et al.

(10) Patent No.: US 11,933,216 B2
(45) Date of Patent: Mar. 19, 2024

(54) SYSTEMS AND METHODS FOR PROVIDING OUTPUT PRODUCTS TO A COMBUSTION CHAMBER OF A GAS TURBINE ENGINE

(71) Applicant: General Electric Company, Schenectady, NY (US)

(72) Inventors: Honggang Wang, Clifton Park, NY (US); Michael Anthony Benjamin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/568,286

(22) Filed: Jan. 4, 2022

(65) Prior Publication Data

US 2023/0212977 A1  Jul. 6, 2023

(51) Int. Cl.
*F02C 3/30* (2006.01)
*F02C 7/232* (2006.01)
*F02C 9/28* (2006.01)
*F23R 3/28* (2006.01)

(52) U.S. Cl.
CPC ............... *F02C 3/30* (2013.01); *F02C 7/232* (2013.01); *F02C 9/28* (2013.01); *F23R 3/286* (2013.01)

(58) Field of Classification Search
CPC ... F02C 3/30; F02C 7/232; F02C 9/28; B64D 2041/005; F05D 2220/323; F05D 2240/35; F05D 2260/60; F05D 2270/082; F05D 2270/301; F23R 3/286; F23R 3/40; H01M 8/04111
See application file for complete search history.

(56) References Cited

U.S. PATENT DOCUMENTS

| | | |
|---|---|---|
| 3,658,279 A | 4/1972 | Robertson |
| 3,805,517 A | 4/1974 | Sewell et al. |
| 4,684,081 A | 8/1987 | Cronin |
| 5,227,256 A | 7/1993 | Marianowski et al. |
| 5,581,995 A | 12/1996 | Lucenko et al. |
| 5,858,314 A | 1/1999 | Hsu et al. |
| 5,968,680 A | 10/1999 | Wolfe et al. |
| 6,183,703 B1 | 2/2001 | Hsu et al. |

(Continued)

FOREIGN PATENT DOCUMENTS

| | | |
|---|---|---|
| CN | 106976405 A | 7/2017 |
| DE | 102005012230 A1 | 10/2005 |

(Continued)

OTHER PUBLICATIONS

Babu D et al., Optimization of Pattern Factor of the Annular Gas Turbine Combustor for Better Turbine Life, IOSR Journal of Mechanical and Civil Engineering, pp. 30-35.

(Continued)

*Primary Examiner* — Arun Goyal
*Assistant Examiner* — Henry Ng
(74) *Attorney, Agent, or Firm* — Dority & Manning, P.A.

(57) ABSTRACT

Systems and methods include a plurality of fuel cell stacks extended around a combustion chamber. The plurality of fuel cell stacks are distributed along a length of the combustion chamber in the axial direction. The fuel cell stacks are configured to provide output products to the combustion chamber to achieve at least one of late lean injection and a desired combustor gas concentration distribution.

20 Claims, 8 Drawing Sheets

(56) References Cited

U.S. PATENT DOCUMENTS

| | | |
|---|---|---|
| 6,296,957 B1 | 10/2001 | Graage |
| 6,348,278 B1 | 2/2002 | LaPierre et al. |
| 6,630,264 B2 | 10/2003 | Haltiner, Jr. et al. |
| 6,641,084 B1 | 11/2003 | Huber et al. |
| 6,834,831 B2 | 12/2004 | Daggett |
| 7,279,243 B2 | 10/2007 | Haltiner, Jr. et al. |
| 7,285,350 B2 | 10/2007 | Keefer et al. |
| 7,380,749 B2 | 6/2008 | Fucke et al. |
| 7,456,517 B2 | 11/2008 | Campbell et al. |
| 7,470,477 B2 | 12/2008 | Zizelman et al. |
| 7,513,119 B2 | 4/2009 | Zielinski et al. |
| 7,578,136 B2 | 8/2009 | Derouineau et al. |
| 7,659,021 B2 | 2/2010 | Horiuchi et al. |
| 7,709,118 B2 | 5/2010 | Lundberg |
| 7,727,495 B2 * | 6/2010 | Burd .................. B01J 8/065 422/617 |
| 7,743,499 B2 | 6/2010 | Pettit et al. |
| 7,781,115 B2 | 8/2010 | Lundberg |
| 7,854,582 B2 | 12/2010 | Ullyott |
| 7,926,287 B2 | 4/2011 | Ullyott et al. |
| 7,966,801 B2 | 6/2011 | Umeh et al. |
| 7,966,830 B2 | 6/2011 | Daggett |
| 8,141,360 B1 | 3/2012 | Huber |
| 8,232,670 B2 | 7/2012 | Breit et al. |
| 8,268,510 B2 | 9/2012 | Rock et al. |
| 8,288,060 B2 | 10/2012 | Bae et al. |
| 8,309,270 B2 | 11/2012 | Finnerty et al. |
| 8,373,381 B2 | 2/2013 | Raiser et al. |
| 8,394,552 B2 | 3/2013 | Gummalla et al. |
| 8,524,412 B2 | 9/2013 | Rock et al. |
| 8,722,270 B2 | 5/2014 | Pastula et al. |
| 8,727,270 B2 | 5/2014 | Burns et al. |
| 8,732,532 B2 | 5/2014 | Higeta |
| 8,820,677 B2 | 9/2014 | Rajashekara et al. |
| 8,846,255 B2 | 9/2014 | Dineen |
| 8,875,519 B2 | 11/2014 | Dooley |
| 8,950,703 B2 | 2/2015 | Bayliss et al. |
| 9,005,847 B2 | 4/2015 | Rock et al. |
| 9,028,990 B2 | 5/2015 | Gans et al. |
| 9,054,385 B2 | 6/2015 | Jones et al. |
| 9,059,440 B2 | 6/2015 | Hotto |
| 9,068,748 B2 | 6/2015 | Hoke |
| 9,118,054 B2 | 8/2015 | Gummalla et al. |
| 9,347,379 B2 | 5/2016 | Dooley |
| 9,359,956 B2 | 6/2016 | Dooley |
| 9,435,230 B2 | 9/2016 | Kim et al. |
| 9,444,108 B2 | 9/2016 | Brousseau |
| 9,464,573 B2 | 10/2016 | Remy et al. |
| 9,541,001 B2 | 1/2017 | Steinwandel et al. |
| 9,604,730 B2 | 3/2017 | Hagh et al. |
| 9,617,006 B2 | 4/2017 | Brugger et al. |
| 9,666,888 B2 | 5/2017 | Nagai et al. |
| 9,777,638 B2 | 10/2017 | Freidl |
| 9,897,041 B2 | 2/2018 | Hoffjann et al. |
| 9,966,619 B2 | 5/2018 | Libis et al. |
| 10,008,726 B2 | 6/2018 | Leah et al. |
| 10,035,607 B2 | 7/2018 | Wangemann et al. |
| 10,069,150 B2 | 9/2018 | Mata et al. |
| 10,224,556 B2 | 3/2019 | Lents et al. |
| 10,318,003 B2 | 6/2019 | Gannon et al. |
| 10,443,504 B2 | 10/2019 | Dalal |
| 10,446,858 B2 | 10/2019 | Palumbo et al. |
| 10,487,839 B2 | 11/2019 | Kupiszewski et al. |
| 10,622,653 B2 | 4/2020 | Whyatt et al. |
| 10,641,179 B2 | 5/2020 | Hayama et al. |
| 10,644,331 B2 | 5/2020 | Stoia et al. |
| 10,671,092 B2 | 6/2020 | DiRusso et al. |
| 10,676,208 B2 | 6/2020 | Wangemann et al. |
| 10,724,432 B2 | 7/2020 | Shapiro et al. |
| 10,737,802 B2 | 8/2020 | Krug et al. |
| 10,762,726 B2 | 9/2020 | Gansler et al. |
| 10,766,629 B2 | 9/2020 | Mercier-Calvairac et al. |
| 10,774,741 B2 | 9/2020 | Sennoun |
| 10,814,992 B2 | 10/2020 | Halsey et al. |
| 10,913,543 B2 | 2/2021 | Bailey et al. |
| 10,919,635 B2 | 2/2021 | Edgar et al. |
| 10,967,984 B2 | 4/2021 | Willford et al. |
| 10,978,723 B2 | 4/2021 | Lo et al. |
| 2002/0163819 A1 | 11/2002 | Treece |
| 2004/0081871 A1 | 4/2004 | Kearl et al. |
| 2004/0150366 A1 | 8/2004 | Ferrall et al. |
| 2006/0010866 A1 | 1/2006 | Rehg et al. |
| 2006/0280979 A1 * | 12/2006 | Tsunoda .................. F01D 15/10 429/479 |
| 2007/0020567 A1 * | 1/2007 | Branston .............. F23C 99/001 434/356 |
| 2008/0155984 A1 | 7/2008 | Liu et al. |
| 2009/0223225 A1 * | 9/2009 | Kraemer .................. F23R 3/40 60/737 |
| 2010/0133475 A1 | 6/2010 | Kobayashi et al. |
| 2010/0159303 A1 | 6/2010 | Rock et al. |
| 2010/0170252 A1 * | 7/2010 | Venkataraman ........ F23N 1/002 60/742 |
| 2011/0071707 A1 | 3/2011 | Crumm et al. |
| 2012/0083387 A1 * | 4/2012 | Turner .................... B60L 58/30 180/65.265 |
| 2012/0161512 A1 | 6/2012 | Metzler et al. |
| 2012/0301814 A1 | 11/2012 | Beasley et al. |
| 2013/0099560 A1 | 4/2013 | Shipley et al. |
| 2013/0280634 A1 | 10/2013 | Park et al. |
| 2014/0023945 A1 | 1/2014 | Epstein et al. |
| 2014/0325991 A1 | 11/2014 | Liew et al. |
| 2015/0030947 A1 | 1/2015 | Saunders et al. |
| 2015/0151844 A1 | 6/2015 | Anton et al. |
| 2016/0260991 A1 | 9/2016 | Shapiro et al. |
| 2017/0070088 A1 | 3/2017 | Bernsten et al. |
| 2017/0363015 A1 * | 12/2017 | Minto .................... F23N 5/242 |
| 2018/0003072 A1 | 1/2018 | Lents et al. |
| 2018/0141675 A1 | 5/2018 | Halsey et al. |
| 2018/0166734 A1 | 6/2018 | Linde et al. |
| 2018/0319283 A1 | 11/2018 | Battin et al. |
| 2018/0355793 A1 * | 12/2018 | Vise .......................... F02K 7/00 |
| 2019/0121369 A1 | 4/2019 | DiRusso et al. |
| 2019/0136761 A1 | 5/2019 | Shapiro et al. |
| 2019/0145273 A1 | 5/2019 | Frank et al. |
| 2019/0214663 A1 * | 7/2019 | Teichmann ............... H02J 3/00 |
| 2019/0379071 A1 * | 12/2019 | Mathé ............... H01M 8/04302 |
| 2020/0014044 A1 | 1/2020 | Tichy et al. |
| 2020/0062414 A1 | 2/2020 | Hon et al. |
| 2020/0136163 A1 | 4/2020 | Holland et al. |
| 2020/0149479 A1 | 5/2020 | Des Roches-Dionne et al. |
| 2020/0194799 A1 | 6/2020 | Hart et al. |
| 2020/0313207 A1 | 10/2020 | Milcarek et al. |
| 2021/0003281 A1 | 1/2021 | Amble et al. |
| 2021/0075034 A1 | 3/2021 | Irie et al. |
| 2021/0115857 A1 | 4/2021 | Collopy |
| 2022/0123345 A1 * | 4/2022 | Hiwatashi .......... H01M 8/04111 |
| 2022/0285716 A1 * | 9/2022 | Palumbo .......... H01M 8/04022 |

FOREIGN PATENT DOCUMENTS

| | | |
|---|---|---|
| EP | 3805107 A1 | 4/2021 |
| JP | 2009187756 A | 8/2009 |
| JP | 2011002308 A | 1/2011 |
| JP | 2018087501 A | 6/2018 |
| KR | 20090064853 A | 6/2009 |
| WO | WO2018108962 A1 | 6/2018 |
| WO | WO2020/011380 A1 | 1/2020 |

OTHER PUBLICATIONS

Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.

Code of Federal Regulations, National Archives, Title 14, Chapter I, Subchapter C, Part 33, §33.75 Safety Analysis, 2007, refer to p. 25 of 50. https://www.ecfr.gov/cgi-bin/text-idx?SID=5e1a000b517423bb51a8f713ca211b68&mc=true&node=pt14.1.33&rgn=div5#se14.1.33_175.

Honegger, Gas Turbine Combustion Modeling for a Parametric Emissions Monitoring System, Thesis Kansas State University

(56) References Cited

OTHER PUBLICATIONS

College of Engineering, Manhattan Kansas, 2004, 97 Pages. https://core.ac.uk/download/pdf/5164453.pdf.
Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.1002/wene.246.
Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.
Thorud, Dynamic Modelling and Characterisation of a Solid Oxide Fuel Cell Integrated in a Gas Turbine Cycle, Trondheim, NTNU, Oct. 2005, 278 Pages.
Turbine Engine Relighting in Flight, Certification Memorandum, CM-PIFS-010, European Aviation Safety Agency (EASA), Issue 1, Apr. 29, 2015, 6 Pages.
Whyatt et al., Electrical Generation for More-Electric Aircraft Using Solid Oxide Fuel Cells, No. PNNL-21382, Pacific Northwest National Lab (PNNL), Richland WA, 2012, 110 Pages. https://www.energy.gov/sites/prod/files/2014/03/f9/sofc_for_aircraft_pnnl_2012.pdf.

\* cited by examiner

SYSTEMS AND METHODS FOR PROVIDING OUTPUT PRODUCTS TO A COMBUSTION CHAMBER OF A GAS TURBINE ENGINE

FIELD

The present disclosure relates to a system and method for providing output products to a combusting chamber of a gas turbine engine, the propulsion system including a fuel cell.

BACKGROUND

A gas turbine engine generally includes a turbomachine and a rotor assembly. Gas turbine engines, such as turbofan engines, may be used for aircraft propulsion. In the case of a turbofan engine, the turbomachine includes a compressor section, a combustion section, and a turbine section in serial flow order, and the rotor assembly is configured as a fan assembly.

During operation, air is compressed in the compressor section and mixed with fuel and ignited in the combustion section for generating combustion gases which flow downstream through the turbine section. The turbine section extracts energy therefrom for rotating the compressor section and fan assembly to power the gas turbine engine and propel an aircraft incorporating such a gas turbine engine in flight.

Combustor power is adjusted to meet fan speed demand or thrust demand. A temperature of a combustor of the combustion section may be dependent on the combustor power and may be an operating limit of the gas turbine engine. Accordingly, achieving a combustor power may cause the combustor temperature to change in a way that increases emissions. If a combustor temperature is too low, there may be an increase in carbon monoxide (CO). And, if a combustor temperature is too high, there may be an increase in nitrogen oxides ($NO_x$). Accordingly, systems and methods that can achieve a desired combustor power while reducing emissions would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
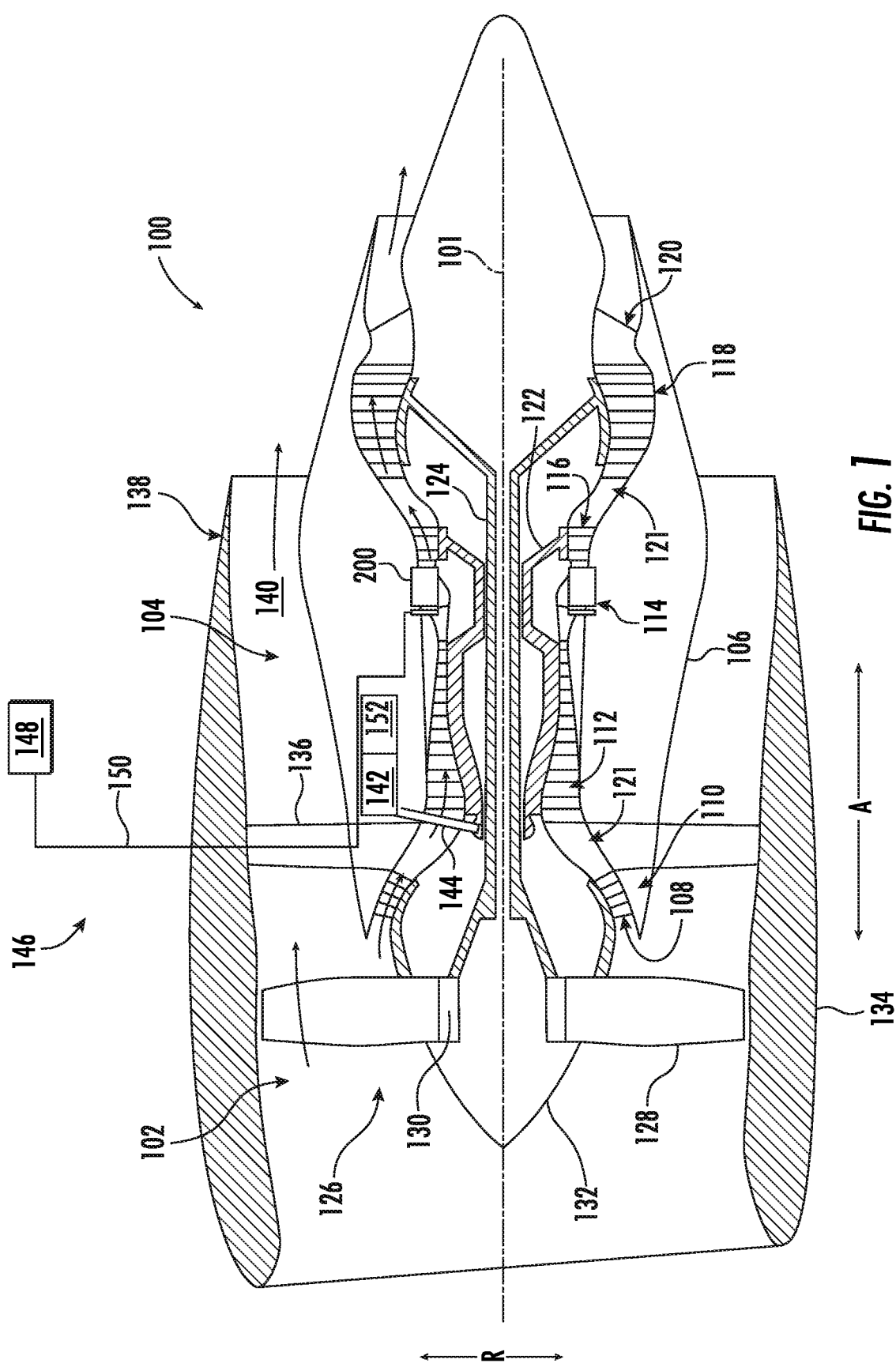
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high", or their respective comparative degrees (e.g., —er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

The term "equivalence ratio" refers to the ratio of the actual fuel/air ratio to the stoichiometric fuel/air ratio. Stoichiometric combustion occurs when all the oxygen is consumed in the reaction, and there is no molecular oxygen ($O_2$) in the products.

If the equivalence ratio is equal to one, the combustion is stoichiometric. If it is <1, the combustion is lean (fuel lean) with excess air, and if it is >1, the combustion is rich (fuel rich) with incomplete combustion. The equivalence ratio is inverse to the air to fuel ratio.

The exhaust from an aircraft gas turbine engine is composed of CO, carbon dioxide ($CO_2$), water vapor ($H_2O$), unburned hydrocarbons (UHC), particulate matter (mainly carbon), $NO_x$, and excess atmospheric oxygen and nitrogen.

As used herein, a "late lean injection system" may be generally described as a system for injecting a mixture of fuel and air into the flow of working fluid at any point that is downstream of the primary fuel nozzles of the combustor and upstream of the turbine. In certain embodiments, a "late lean injection system" is more specifically described as a system for injecting a fuel/air mixture into the aft end of the primary combustion chamber defined by the liner. In general, one of the objectives of late lean injection systems includes enabling fuel combustion that occurs downstream of primary combustors/primary combustion zone. This type of operation may be used to improve NON performance.

If a combustor temperature is too low, there may be an increase in carbon monoxide (CO). And, if a combustor temperature is too high, there may be an increase in nitrogen oxides (NON). If the residence time in the flame zone is too long, there may be an increase in NON. And if the residence time in the flame zone is too short, there may be an increase in CO. The equivalence ratio at the different location of the combustor may also affect the emission output.

System and methods provide output products from a fuel cell to a combustion chamber of a gas turbine engine. In particular, the output products may be provided according to a desired distribution of output products. For example, the output products may be provided at a downstream location of a combustion chamber to reduce the residence time of the output products in the combustion chamber and thereby reduce emissions of the combustion chamber. In addition, the systems and methods described herein may provide a desired temperature distribution and/or distribution of output products along the length of the combustion chamber. For example, the distribution of output products may be determined such that the temperature along a length of the combustion chamber is within a temperature range for low emissions. Output products may be provided at different locations along the length of the combustion chamber to reduce emissions by increasing or decreasing temperatures to move the temperatures into a low-emissions temperature range.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle.

For example, the engine may be an aeronautical engine incorporated into an aircraft. Alternatively, however, the engine may be any other suitable type of engine for any other suitable vehicle.

For the embodiment depicted, the engine is configured as a high bypass gas turbine engine 100. As shown in FIG. 1, the gas turbine engine 100 defines an axial direction A (extending parallel to a centerline axis 101 provided for reference), a radial direction R, and a circumferential direction (extending about the axial direction A; not depicted in FIG. 1). In general, the gas turbine engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet exhaust nozzle section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the centerline axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

In such a manner, it will be appreciated that gas turbine engine 100 generally includes a first stream (e.g., core air flowpath 121) and a second stream (e.g., bypass airflow passage 140) extending parallel to the first stream. In certain exemplary embodiments, the gas turbine engine 100 may further define a third stream extending, e.g., from the LP compressor 110 to the bypass airflow passage 140 or to ambient. With such a configuration, the LP compressor 110 may generally include a first compressor stage configured as a ducted mid-fan and downstream compressor stages. An inlet to the third stream may be positioned between the first compressor stage and the downstream compressor stages.

Referring still to FIG. 1, the gas turbine engine 100 additionally includes an accessory gearbox 142 and a fuel delivery system 146. For the embodiment shown, the accessory gearbox 142 is located within the cowling/outer casing 106 of the turbomachine 104. Additionally, it will be appreciated that for the embodiment depicted schematically in FIG. 1, the accessory gearbox 142 is mechanically coupled to, and rotatable with, one or more shafts or spools of the turbomachine 104. For example, in the exemplary embodiment depicted, the accessory gearbox 142 is mechanically coupled to, and rotatable with, the HP shaft 122 through a suitable geartrain 144. The accessory gearbox 142 may provide power to one or more suitable accessory systems of the gas turbine engine 100 during at least certain operations, and may further provide power back to the gas turbine engine 100 during other operations. For example, the accessory gearbox 142 is, for the embodiment depicted, coupled to a starter motor/generator 152. The starter motor/generator may be configured to extract power from the accessory gearbox 142 and gas turbine engine 100 during certain operation to generate electrical power, and may provide power back to the accessory gearbox 142 and gas turbine engine 100 (e.g., to the HP shaft 122) during other operations to add mechanical work back to the gas turbine engine 100 (e.g., for starting the gas turbine engine 100).

Moreover, the fuel delivery system 146 generally includes a fuel source 148, such as a fuel tank, and one or more fuel delivery lines 150. The one or more fuel delivery lines 150 provide a fuel flow through the fuel delivery system 146 to the combustion section 114 of the turbomachine 104 of the gas turbine engine 100. As will be discussed in more detail below, the combustion section 114 includes an integrated fuel cell and combustor assembly 200. The one or more fuel delivery lines 150, for the embodiment depicted, provide a flow of fuel to the integrated fuel cell and combustor assembly 200.

It will be appreciated, however, that the exemplary gas turbine engine 100 depicted in FIG. 1 is provided by way of example only. In other exemplary embodiments, any other suitable gas turbine engine may be utilized with aspects of the present disclosure. For example, in other embodiments, the turbofan engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Moreover, although the exemplary gas turbine engine 100 includes a ducted fan 126, in other exemplary aspects, the gas turbine engine 100 may include an unducted fan 126 (or open rotor fan), without the nacelle 134. Further, although not depicted herein, in other embodiments the gas turbine engine may be any other suitable type of gas turbine engine, such as a nautical gas turbine engine.

Figure 2:
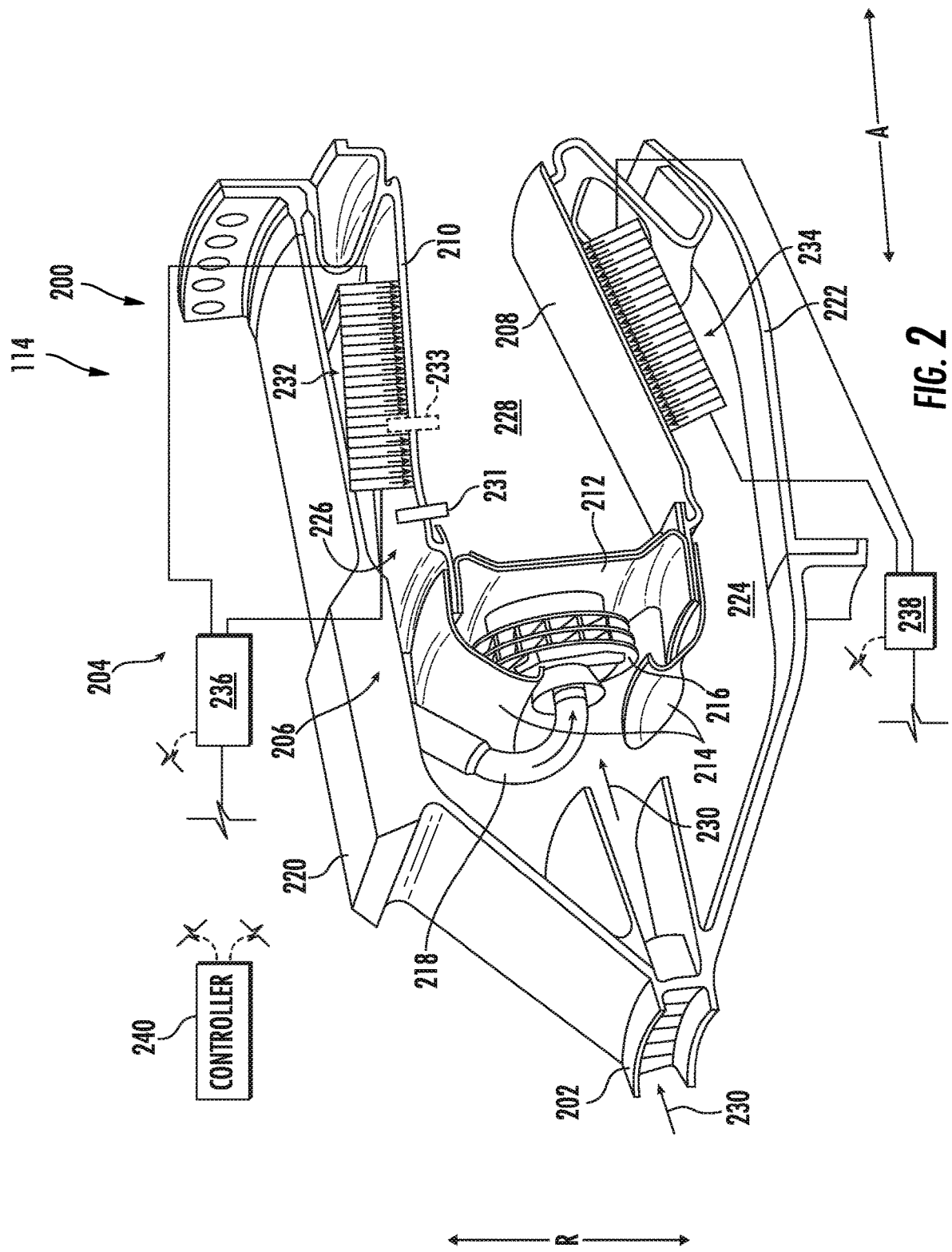
FIG. 2 is a perspective view of an integrated fuel cell and combustor assembly in accordance with the present disclosure.

Referring now to FIG. 2, schematically illustrating a portion of the combustion section 114 including a portion of the integrated fuel cell and combustor assembly 200 used in the gas turbine engine 100 of FIG. 1 (described as a gas turbine engine 100 above with respect to FIG. 1), according to an embodiment of the present disclosure.

As will be appreciated, the combustion section 114 includes a compressor diffuser nozzle 202 and extends between an upstream end and a downstream end generally along the axial direction A. The combustion section 114 is fluidly coupled to the compressor section at the upstream end via the compressor diffuser nozzle 202 and to the turbine section at the downstream end.

The integrated fuel cell and combustor assembly 200 generally includes a fuel cell assembly 204 (only partially depicted in FIG. 2; see also FIGS. 3 through 4) and a combustor 206. The combustor 206 includes an inner liner 208, an outer liner 210, a dome assembly 212, a cowl assembly 214, a swirler assembly 216, and a fuel flowline 218. The combustion section 114 generally includes an outer casing 220 outward of the combustor 206 along the radial direction R to enclose the combustor 206 and an inner casing 222 inward of the combustor 206 along the radial direction R.

The inner casing 222 and inner liner 208 define an inner passageway 224 therebetween, and the outer casing 220 and outer liner 210 define an outer passageway 226 therebetween. The inner casing 222, the outer casing 220, and the dome assembly 212 together define at least in part a combustion chamber 228 of the combustor 206.

The dome assembly 212 is disposed proximate the upstream end of the combustion section 114 (i.e., closer to the upstream end than the downstream end) and includes an opening 229 for receiving and holding the swirler assembly 216. The swirler assembly 216 also includes an opening for receiving and holding the fuel flowline 218.

The fuel flowline 218 is further coupled to the fuel source 148 (see FIG. 1) disposed outside the outer casing 220 along the radial direction R and configured to receive the fuel from the fuel source 148. In such a manner, the fuel flowline 218 may be fluidly coupled to the one or more fuel delivery lines 150 described above with reference to FIG. 1.

The swirler assembly 216 can include a plurality of swirlers (not shown) configured to swirl the compressed fluid before injecting it into the combustion chamber 228 to generate combustion gas. The cowl assembly 214, in the embodiment depicted, is configured to hold the inner liner 208, the outer liner 210, the swirler assembly 216, and the dome assembly 212 together.

During operation, the compressor diffuser nozzle 202 is configured to direct a compressed fluid 230 from the compressor section to the combustor 206, where the compressed fluid 230 is configured to be mixed with fuel within the swirler assembly 216 and combusted within the combustion chamber 228 to generate combustion gasses. The combustion gasses are provided to the turbine section to drive one or more turbines of the turbine section (e.g., the high pressure turbine 116 and low pressure turbine 118).

During operation of the gas turbine engine 100 including the integrated fuel cell and combustor assembly 200, a flame within the combustion chamber 228 is maintained by a continuous flow of fuel and air. In order to provide for an ignition of the fuel and air, e.g., during a startup of the gas turbine engine 100, the integrated fuel cell and combustor assembly 200 further includes an ignitor 231. The ignitor 231 may provide a spark or initial flame to ignite a fuel and air mixture within the combustion chamber 228. In certain exemplary embodiments, the integrated fuel cell and combustor assembly 200 may additionally include a dedicated fuel cell ignitor 233 (depicted in phantom). For the embodiment of FIG. 2, the dedicated fuel cell ignitor 233 is positioned downstream of at least a portion of a fuel cell, and in particular of a fuel cell stack (described below). In such a manner, the dedicated fuel cell ignitor 233 may more effectively combust output products of the fuel cell.

Figure 3:
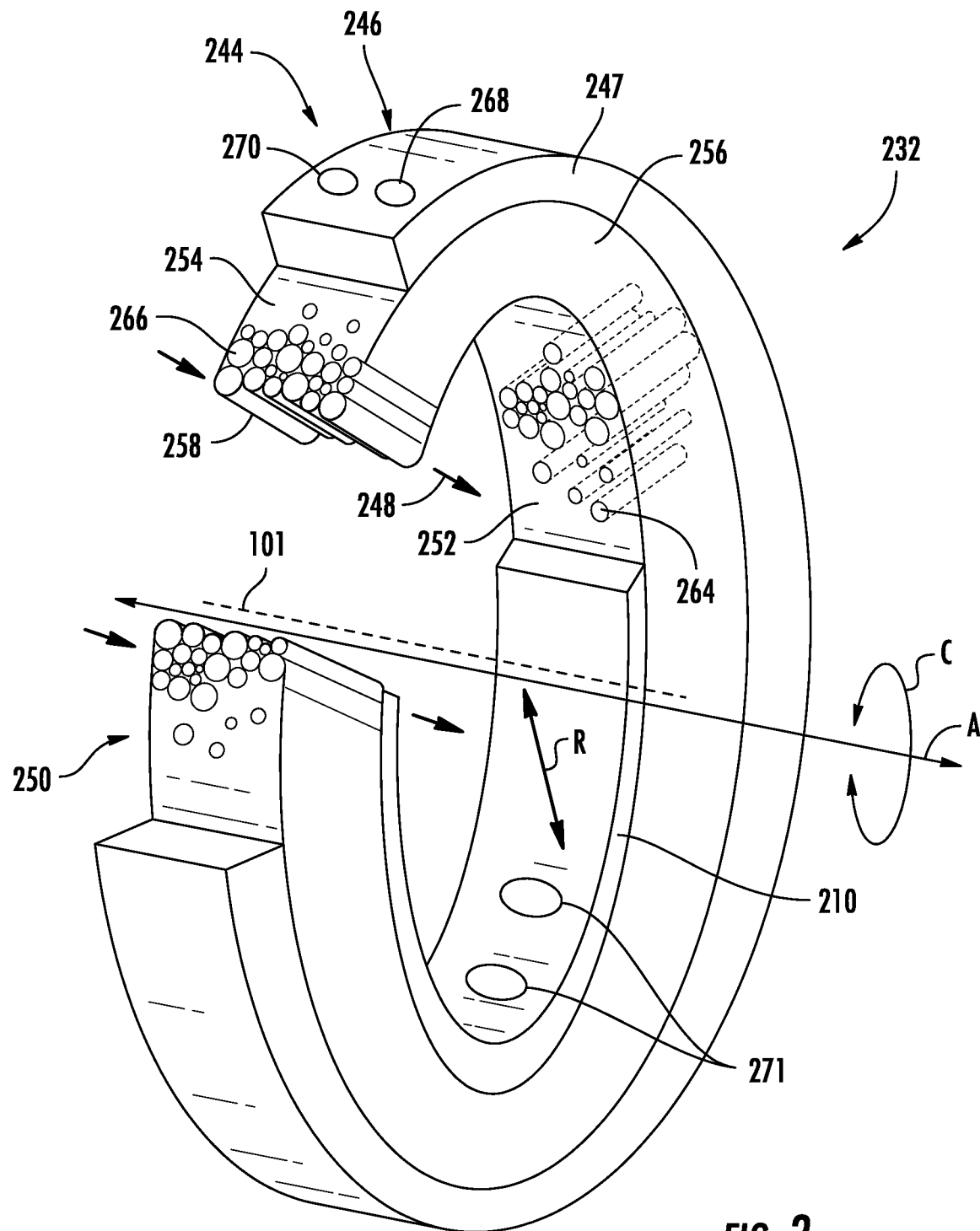
FIG. 3 is a partially cut-away, cross sectional, perspective view of a fuel cell stack of the integrated fuel cell and combustor assembly of FIG. 2.

As mentioned above and depicted schematically in FIG. 2, the integrated fuel cell and combustor assembly 200 further includes the fuel cell assembly 204. A fuel cell stack 232, 234 (e.g., a fuel and air conditioning device) of the fuel cell assembly 204 may be cylindrical (e.g., not necessarily a circular cross-section) and extend around the outer liner 210 (e.g., fuel cell stack 232 as shown in FIG. 3) or inside the inner liner 208 (e.g., fuel cell stack 234) of the combustion chamber 228.

For example, the combustor 206 is an annular combustor and the fuel cell stack 232 of the fuel cell assembly 204 extends around (or is integrated with) the outer liner 210 of the combustor 206 defining the combustion chamber 228, or a casing (e.g., outer casing 220). Such a configuration will be discussed further and shown in more detail below with reference to FIG. 3.

Additionally or alternatively, the fuel cell stack 234 of the fuel cell assembly 204 extends inside (or is integrated with) the inner liner 208 of the combustor 206 defining the combustion chamber 228, or a casing (e.g., inner casing 222).

In the embodiment of FIG. 2, the fuel cell stacks 232, 234 may be part of the same fuel cell assembly 204 (e.g., sharing common structures and components facilitating operation of the fuel cell assembly 204).

Alternatively, however, in other exemplary embodiments, the first fuel cell stack 232 may be part of a first fuel cell assembly and the second fuel cell stack 234 may be part of a second fuel cell assembly (e.g., each having separate components facilitating operation).

Operation of the fuel cell assembly 204, and more specifically of a fuel cell stack 232, 234 of the fuel cell assembly 204, will be described in more detail below.

For the embodiment depicted, the fuel cell assembly 204 is configured as a solid oxide fuel cell ("SOFC") assembly, including a SOFC fuel cell stack (e.g., having a plurality of SOFC's arranged in a circumferential direction).

As will be appreciated, a SOFC is generally an electrochemical conversion device that produces electricity directly from oxidizing a fuel. In general, fuel cell assemblies, and in particular fuel cells, are characterized by an electrolyte material utilized. The SOFC's of the present disclosure may generally include a solid oxide or ceramic electrolyte. This class of fuel cells generally exhibit high combined heat and power efficiency, long-term stability, fuel flexibility, and low emissions.

Further, in other exemplary embodiments, the fuel cell assembly 204 may include any other suitable number and arrangement of fuel cell stacks 232, 234 to distribute output products at various locations along the axial and circumferential direction of the combustion chamber 228 having different parameters (e.g., temperatures, pressures, compositions, etc.).

The exemplary fuel cell assembly 204 further includes power converters 236, 238. The fuel cell assembly 204 is in electrical communication with the power converters 236, 238 by a plurality of power supply cables (not labeled).

The power converter 236, 238 controls the electrical current drawn from the respective fuel cell stack 232, 234 of the fuel cell assembly 204 and may convert the electrical power from a direct current ("DC") power to either DC power at another voltage level or alternating current ("AC") power. Similarly, in embodiments described in further detail below including multiple fuel cell assemblies, each fuel cell assembly may have an associated power converter that controls the electrical current drawn from the fuel cell assembly and may convert the electrical power from a DC power to either DC power at another voltage level or AC power. The first power converter 236, second power converter 238, and any other power converter, may be electrically coupled to an electric bus (such as the electric bus 326 described below).

The integrated fuel cell and combustor assembly 200 further includes a fuel cell controller 240 that is in operable communication with both of the first power converter 236 and second power converter 238 to, e.g., send and receive communications and signals therebetween. For example, the fuel cell controller 240 may send current or power setpoint signals to the first power converter 236 and second power converter 238, and may receive, e.g., a voltage or current feedback signal from the first power converter 236 and second power converter 238. The fuel cell controller 240 is further described below with reference to FIG. 4.

In certain embodiments described in further detail below, the fuel cell assembly 204 includes a plurality of fuel cell stacks that are distributed along the axial direction A of the combustor 206. Fuel to the plurality of fuel cell stacks (e.g., from the fuel source 148 or through elements of the fuel cell and combustor assembly 200 described herein) may be varied to distribute output products or fuel to the combustor 206 along the axial direction A of the combustor 206.

For example, a "late lean" approach uses more fuel burned at a downstream end of the combustor 206. The "late lean" approach may be implemented to reduce a residence time of the fuel in the combustor 206.

As will be discussed in more detail below, fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems may advantageously be utilized as an energy supply system because fuel cell systems may be considered environmentally superior and highly efficient when compared to at least certain existing systems.

To improve system efficiency and fuel utilization and reduce external water usage, the fuel cell system may include an anode recirculation loop. As a single fuel cell can only generate about 1V voltage, a plurality of fuel cells may be stacked together (which may be referred to as a fuel cell stack) to generate a desired voltage. Fuel cells may include Solid Oxide Fuel Cells (SOFC), Molten Carbonate Fuel Cells (MCFC), Phosphoric Acid Fuel Cells (PAFC), and, Proton Exchange Membrane Fuel Cells (PEMFC), all generally named after their respective electrolytes.

It will be appreciated that in at least certain exemplary embodiments the fuel cell stack 232, 234 may extend substantially 360 degrees in a circumferential direction C of the gas turbine engine (i.e., a direction extending about the centerline axis 101 of the gas turbine engine 100). For example, referring now to FIG. 3, a cross-sectional cut-away perspective view of the fuel cell stack 232 is depicted according to an exemplary embodiment of the present disclosure. Additional fuel cell assemblies described in further detail below may be configured in a similar manner.

As shown, the fuel cell stack 232 extends around the outer liner 210 of the combustion chamber 228 in the circumferential direction C, completely encircling the outer liner 210 of the combustion chamber 228 around the centerline axis 101 in the embodiment shown. More specifically, the fuel cell stack 232 (e.g., a plurality of fuel cells that are coupled together is referred to as a fuel cell stack) is arranged along the circumferential direction C. The fuel cells of the fuel cell stack 232 that are visible in FIG. 3 can be arranged as a single ring or cylinder. As described in further detail below, the fuel cells stack 232 may have a thickness with respect to the axial direction A (see FIG. 2). In another instance, multiple additional rings of fuel cells can be placed on top or outside of each other (e.g., radially stacked or concentrically arranged) to form the fuel cell stack 232 that has an elongated length in the radial direction R.

As will be explained in more detail, below, with reference to FIG. 4, the fuel cell stack 232 is positioned to receive discharged air 244 from, e.g., the compressor section and fuel 246 from the fuel delivery system 146. The fuel cell stack 232 may include a channel 247 around the outside of the fuel cell stack 232. The channel 247 receives the air 244 and fuel 246 and directs and distributes the air 244 and fuel 246 around the outside surface of the fuel cell stack 232 and into the fuel cell stack 232.

In the case of the fuel cell stack 234, the channel 247 is around the inside of the fuel cell stack 234. Here, the channel 247 receives the air 244 and fuel 246 and directs and distributes the air 244 and fuel 246 around the inside surface of the fuel cell stack 234 and into the fuel cell stack 234.

The fuel cell stack 232 generates electrical current using this air 244 and at least some of this fuel 246, and radially directs partially oxidized fuel and unused portion of air (e.g., output products 248) into the combustion chamber 228 (FIG. 2). The combustor 206 (FIG. 2) combusts the partially oxidized fuel and air (the output products 248) in the combustion chamber 228 into combustion gasses that are directed downstream into the turbine section to drive or assist with driving the one or more turbines therein.

The fuel cell stack 232 depicted in FIG. 3 may include a housing 250 having a combustion outlet side 252 and a fuel and air inlet side 254 that is opposite to the combustion outlet side 252, and sides 256, 258. The side 258 is not visible in the perspective view of FIG. 3.

As will be appreciated, alternatively, the fuel cell stack 232 may include a plurality of fuel cell stacks that are "stacked," e.g., side-by-side or concentrically.

The combustion outlet side 252 includes a plurality of combustion outlets 264 and the fuel and air inlet side 254 includes a plurality of fuel and air inlets 266. Where the fuel cell stack 232 is integrated with the liner of the combustion chamber 228, the combustion outlet side 252 may be the outer liner 210 of the combustion chamber 228. Alternatively, the outer liner 210 of the combustion chamber may have openings 271, and the output products 248 directed out of the combustion outlets 264 are directed to move through the openings 271 and into the combustion chamber 228.

The channel 247 includes one or more fuel inlets 268 and one or more air inlets 270. Optionally, the one or more of the inlets 268, 270 can be on another side of the housing 250. Each of the one or more fuel inlets 268 is fluidly coupled with a source of fuel for the fuel cell stack 232, such as one or more pressurized containers of a hydrogen-containing gas or a fuel processing unit as described further below. Each of the one or more air inlets 270 is fluidly coupled with a source of air for the fuel cell stack 232, such as air that is discharged from a compressor section and/or an air processing unit as is also described further below. The inlets 268, 270 separately receive the fuel and air from the external sources of fuel and air, and separately direct the fuel and air into the fuel cell stack 232.

During operation, the channel 247 receives the air 244 and fuel 246 and directs and distributes the air 244 and fuel 246 around the fuel and air inlet side 254 of the fuel cell stack 232 and into the fuel cell stack 232 through the fuel and air inlets 266. The fuel cell stack 232 generates output products, and the output products 248 (e.g., partially oxidized fuel and air) (also referred to herein as "combustion gas"). The output products 248 are generated using fuel and air that is not consumed by the fuel cell 204.

The output products 248 are directed from the combustion outlets 264 out of the combustion outlet side 252 of the housing 250, for example, through openings 271 in the liner of the combustion chamber 228. The output products 248 are provided to the combustion chamber 228 and burned during operation to generate combustion gasses used to generate thrust for the gas turbine engine 100 (and vehicle/aircraft incorporating the gas turbine engine 100).

In certain exemplary embodiments, the fuel cell stack 232 may be configured in a similar manner to one or more of the exemplary fuel cell systems (labeled 108) described in, e.g., U.S. Patent Application Publication No. 2019/0136761 A1, filed Nov. 7, 2017, that is incorporated by reference herein in its entirety.

In certain exemplary embodiments, the fuel cell stack 242 may be configured in a similar manner to one or more of the exemplary fuel cell systems (labeled 100) described in, e.g., U.S. Patent Application Publication No. 2020/0194799 A1, filed Dec. 17, 2018, that is incorporated by reference herein in its entirety.

Figure 4:
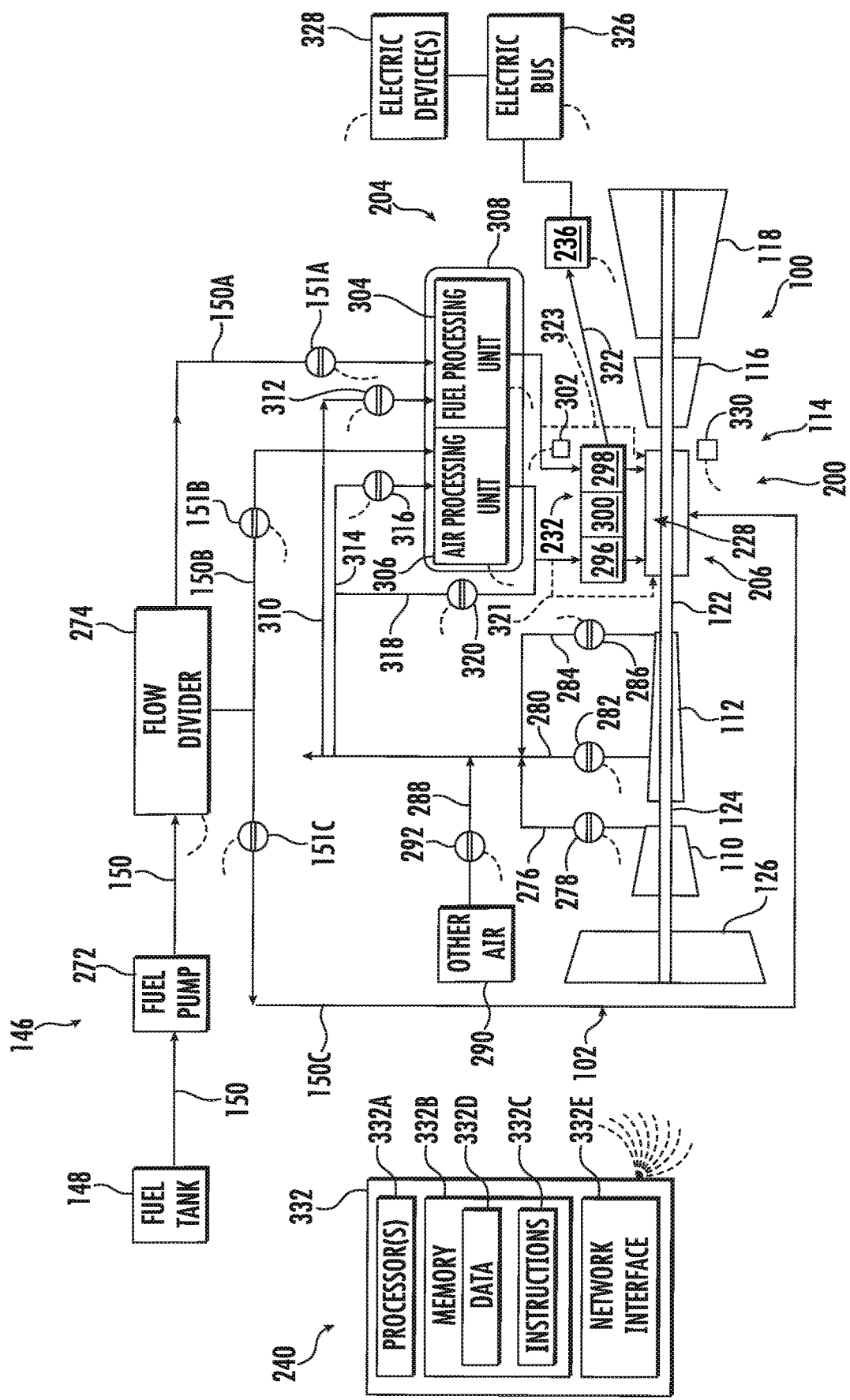
FIG. 4 is a schematic diagram of a gas turbine engine including an integrated fuel cell and combustor assembly in accordance with an exemplary aspect of the present disclosure.

Referring now to FIG. 4, operation of an integrated fuel cell and combustor assembly 200 in accordance with an exemplary embodiment of the present disclosure will be described. More specifically, FIG. 4 provides a schematic illustration of a gas turbine engine 100 and an integrated fuel cell and combustor assembly 200 according to an embodiment of the present disclosure. The gas turbine engine 100 and integrated fuel cell and combustor assembly 200 may, in certain exemplary embodiments, be configured in a similar manner as one or more of the exemplary embodiments of FIGS. 1 through 3.

Accordingly, it will be appreciated that the gas turbine engine 100 generally includes a fan section 102 having a fan 126, an LP compressor 110, an HP compressor 112, a combustion section 114, an HP turbine 116, and an LP turbine 118. The combustion section 114 generally includes the integrated fuel cell and combustor assembly 200 having a combustor 206 and a fuel cell assembly 204.

A propulsion system including the gas turbine engine 100 further includes a fuel delivery system 146. The fuel delivery system 146 generally includes a fuel source 148 and one or more fuel delivery lines 150. The fuel source 148 may include a supply of fuel (e.g., a hydrocarbon fuel, including, e.g., a carbon-neutral fuel or synthetic hydrocarbons) for the gas turbine engine 100. In addition, it will be appreciated that the fuel delivery system 146 also includes a fuel pump 272 and a flow divider 274, and the one or more fuel delivery lines 150 include a first fuel delivery line 150A, a second fuel delivery line 150B, and a third fuel delivery line 150C.

The flow divider 274 divides the fuel flow from the fuel source 148 and fuel pump 272 into a first fuel flow through the first fuel delivery line 150A to the fuel cell assembly 204 (an in particular to a fuel processing unit, described below), a second fuel flow through the second fuel delivery line 150B also to the fuel cell assembly 204 (and in particular to an air processing unit, described below), and a third fuel flow through a third fuel delivery line 150C to the combustor 206.

The flow divider 274 may include a series of valves (not shown) to facilitate such dividing of the fuel flow from the fuel source 148, or alternatively may be of a fixed geometry. Additionally, for the embodiment shown, the fuel delivery system 146 includes a first fuel valve 151A associated with the first fuel delivery line 150A (e.g., for controlling the first fuel flow), a second fuel valve 151B associated with the second fuel delivery line 150B (e.g., for controlling the second fuel flow), and a third fuel valve 151C associated with the third fuel delivery line 150C (e.g., for controlling the third fuel flow).

The gas turbine engine 100 further includes a compressor bleed system and an airflow delivery system. More specifically, the compressor bleed system includes an LP bleed air duct 276 and an associated LP bleed air valve 278, an HP bleed air duct 280 and an associated HP bleed air valve 282, an HP exit air duct 284 and an associated HP exit air valve 286.

The gas turbine engine 100 further includes an air stream supply duct 288 (in airflow communication with an airflow supply 290) and an associated air valve 292, which is also in airflow communication with the airflow delivery system for providing compressed airflow to the fuel cell assembly 204 of the integrated fuel cell and combustor assembly 200. The airflow supply may be, e.g., a second gas turbine engine configured to provide a cross-bleed air, an auxiliary power unit (APU) configured to provide a bleed air, a ram air turbine (RAT), etc. The airflow supply may be complimentary to the compressor bleed system if the compressor air source is inadequate or unavailable.

The compressor bleed system (and air stream supply duct 288) is in airflow communication with airflow delivery system for providing compressed airflow to the fuel cell assembly 204, as will be explained in more detail below.

Referring still to FIG. 4, the fuel cell assembly 204 of the integrated fuel cell and combustor assembly 200 includes a fuel cell stack 232, which may be configured in a similar manner as, e.g., the fuel cell stack 232 described above. The fuel cell stack 232 is depicted schematically as a single fuel cell having a cathode side 296, an anode side 298, and an electrolyte 300 positioned therebetween. As will generally be appreciated, the electrolyte 300 may, during operation, conduct negative oxygen ions from the cathode side 296 to the anode side 298 to generate an electric current and electric power.

The anode side 298 may support electrochemical reactions that generate electricity. A fuel may be oxidized in the anode side 298 with oxygen ions received from the cathode side 296 via diffusion through the electrolyte 300. The reactions may create heat, steam, and electricity in the form of free electrons in the anode side 298, which may be used to supply power to an energy consuming device (such as the one or more additional electric devices 328 described below). The oxygen ions may be created via an oxygen reduction of a cathode oxidant using the electrons returning from the energy consuming device into the cathode side 296.

The cathode side 296 may be coupled to a source of the cathode oxidant, such as oxygen in the atmospheric air. The cathode oxidant is defined as the oxidant that is supplied to the cathode side 296 employed by the fuel cell system in generating electrical power. The cathode side 296 may be permeable to the oxygen ions received from the cathode oxidant.

The electrolyte 300 may be in communication with the anode side 298 and the cathode side 296. The electrolyte 300 may pass the oxygen ions from the cathode side 296 to the anode side 298, and may have little or no electrical conductivity, so as to prevent passage of the free electrons from the cathode side 296 to the anode side 298.

The anode side of a solid oxide fuel cell (such as the fuel cell stack 232) may be composed of a nickel/yttria-stabilized zirconia (Ni/YSZ) cermet. Nickel in the anode side serves as a catalyst for fuel oxidation and current conductor. During normal operation of the fuel cell stack 232, the operating temperature may be greater than or equal to about 700° C., and the nickel (Ni) in the anode remains in its reduced form due to the continuous supply of primarily hydrogen fuel gas. Other configurations are contemplated as well.

Briefly, it will be appreciated that the fuel cell assembly 204 further includes a fuel cell sensor 302 configured to sense data indicative of a fuel cell assembly operating parameter, such as a temperature of the fuel cell stack 232 (e.g., of the cathode side 296 or anode side 298 of the fuel cell), a pressure within the fuel cell stack 232 (e.g., of within the cathode side 296 or anode side 298 of the fuel cell).

The fuel cell stack 232 is disposed downstream of the LP compressor 110, the HP compressor 112, or both. Further, as will be appreciated from the description above with respect to FIG. 2, the fuel cell stack 232 may be coupled to or otherwise integrated with a liner of the combustor 206 (e.g., the outer liner 210, or the inner liner 208 for fuel cell stack 234). In such a manner, the fuel cell stack 232 may also be arranged upstream of a combustion chamber 228 of the integrated fuel cell and combustor assembly 200, and further upstream of the HP turbine 116 and LP turbine 118.

As shown in FIG. 4, the fuel cell assembly 204 also includes a fuel processing unit 304 (e.g., a fuel and air premixing device) and an air processing unit 306. In the exemplary embodiment depicted, the fuel processing unit 304 and air processing unit 306 are manifolded together within a housing 308 to provide conditioned air and fuel to the fuel cell stack 232.

The fuel processing unit 304 may be any suitable structure for generating a hydrogen rich fuel stream. For example, the fuel processing unit 304 may include a fuel reformer or a catalytic partial oxidation convertor ($CPO_x$) for developing the hydrogen rich fuel stream for the fuel cell stack 232.

It should be appreciated, however, that the fuel processing unit 304 may additionally or alternatively include any suitable type of fuel reformer, such as an autothermal reformer and steam reformer that may need an additional stream of steam inlet with higher hydrogen composition at the reformer outlet stream. Additionally, or alternatively, still, the fuel processing unit 304 may include a reformer integrated with the fuel cell stack 232.

The air processing unit 306 may be any suitable structure for raising the temperature of air that is provided thereto to a temperature high enough to enable fuel cell temperature control (e.g., about 600° C. to about 800° C.). For example, in the embodiment depicted, the air processing unit includes a preburner system, operating based on a fuel flow through the second fuel delivery line 150B, configured for raising the temperature of the air through combustion, e.g., during transient conditions such as startup, shutdown and abnormal situations.

Similarly, it should be appreciated that the air processing unit 306 of FIG. 4 could alternatively be a heat exchanger or another device for raising the temperature of the air provided thereto to a temperature high enough to enable fuel cell temperature control (e.g., about 600° C. to about 800° C.).

As mentioned above, the compressor bleed system (and air stream supply duct 288) is in airflow communication with airflow delivery system for providing compressed airflow to the fuel cell assembly 204. The airflow delivery system includes an anode airflow duct 310 and an associated anode airflow valve 312 for providing an airflow to the fuel processing unit 304, a cathode airflow duct 314 and associated cathode airflow valve 316 for providing an airflow to the air processing unit 306, and a cathode bypass air duct 318 and an associated cathode bypass air valve 320 for providing an airflow directly to the fuel cell stack 232 (or rather to the cathode side 296 of the fuel cell(s)).

The fuel delivery system 146 is configured to provide the first flow of fuel through the first fuel delivery line 150A to the fuel processing unit 304, and the second flow of fuel through the second fuel delivery line 150B to the air processing unit 306 (e.g., as fuel for a preburner system, if provided).

The fuel cell stack 232 outputs the power produced as a fuel cell power output 322. Further, the fuel cell stack 232 directs a cathode air discharge and an anode fuel discharge (e.g., output products, neither labeled for clarity purposes) into the combustion chamber 228 of the combustor 206.

In operation, the air processing unit 306 is configured to heat/cool a portion of the compressed air, incoming through the cathode airflow duct 314, to generate a processed air to be directed into the fuel cell stack 232 to facilitate the functioning of the fuel cell stack 232. The air processing unit 306 receives the second flow of fuel from the second fuel delivery line 150B and may, e.g., combust such second flow of fuel to heat the air received to a desired temperature (e.g., about 600° C. to about 800° C.) to facilitate the functioning of the fuel cell stack 232. The air processed by the air processing unit 306 is directed into the fuel cell stack 232. In an embodiment of the disclosure, as is depicted, the cathode bypass air duct 318 and the air processed by the air processing unit 306 may combine into a combined air stream to be fed into the cathode 296 of the fuel cell stack 232.

Further, as shown in the embodiment of FIG. 4, the first flow of fuel through the first fuel delivery line 150A is directed to the fuel processing unit 304 for developing a hydrogen rich fuel stream (e.g., optimizing a hydrogen content of a fuel stream), to also be fed into the fuel cell stack 232. As will be appreciated, and as discussed below, the flow of air (processed air and bypass air) to the fuel cell stack 232 (e.g., the cathode side 296) and fuel from the fuel processing unit 304 to the fuel cell stack 232 (e.g., the anode side 298) may facilitate electrical power generation.

Because the inlet air for the fuel cell stack 232 may come solely from the upstream compressor section without any other separately controlled air source, it will be appreciated that the inlet air for the fuel cell stack 232 discharged from the compressor section is subject to the air temperature changes that occur at different flight stages. By way of illustrative example only, the air within a particular location in the compressor section of the gas turbine engine 100 may work at 200° C. during idle, 600° C. during take-off, 268° C. during cruise, etc. This type of temperature change to the inlet air directed to the fuel cell stack 232 may lead to significant thermal transient issues (or even thermal shock) to the ceramic materials of the fuel cell stack 232, which could range from cracking to failure.

Thus, by fluidly connecting the air processing unit 306 between the compressor section and the fuel cell stack 232, the air processing unit 306 may serve as a control device or system to maintain the air processed by the air processing unit 306 and directed into the fuel cell stack 232 within a desired operating temperature range (e.g., plus or minus 100° C., or preferably plus or minus 50° C., or plus or minus 20° C.). In operation, the temperature of the air that is provided to the fuel cell stack 232 can be controlled (relative to a temperature of the air discharged from the compressor section) by controlling the flow of fuel to the air processing unit 306. By increasing a fuel flow to the air processing unit 306, a temperature of the airflow to the fuel cell stack 232 may be increased. By decreasing the fuel flow to the air processing unit 306, a temperature of the airflow to the fuel cell stack 232 may be decreased. Optionally, no fuel can be delivered to the air processing unit 306 to prevent the air processing unit 306 from increasing and/or decreasing the temperature of the air that is discharged from the compressor section and directed into the air processing unit 306.

Moreover, as is depicted in phantom, the fuel cell assembly 204 further includes an airflow bypass duct 321 extending around the fuel cell stack 232 to allow a portion or all of an airflow conditioned by the air processing unit 306 (and combined with any bypass air through duct 318) to bypass the cathode side 296 of the fuel cell stack 232 and go directly to the combustion chamber 228. The airflow bypass duct 321 may be in thermal communication with the fuel cell stack 232. The fuel cell assembly further includes a fuel bypass duct 323 extending around the fuel cell stack 232 to allow a portion or all of a reformed fuel from the fuel processing unit 304 to bypass the anode side 298 of the fuel cell stack 232 and go directly to the combustion chamber 228.

As briefly mentioned above, the fuel cell stack 232 converts the anode fuel stream from the fuel processing unit 304 and air processed by the air processing unit 306 sent into the fuel cell stack 232 into electrical energy, the fuel cell power output 322, in the form of DC current. This fuel cell power output 322 is directed to a power converter 236 to change the DC current into DC current or AC current that can be effectively utilized by one or more subsystems.

For the embodiment depicted, the electrical power is provided from the power converter to an electric bus 326. The electric bus 326 may be an electric bus dedicated to the gas turbine engine 100, an electric bus of an aircraft incorporating the gas turbine engine 100, or a combination thereof. The electric bus 326 is in electric communication with one or more additional electrical devices 328, which may be adapted to draw an electric current from, or apply an electrical load to, the fuel cell stack 232.

The one or more additional electrical devices 328 may be a power source, a power sink, or both. For example, the additional electrical devices 328 may be a power storage device (such as one or more batteries), an electric machine (an electric generator, an electric motor, or both), an electric propulsion device, etc. For example, the one or more additional electric devices 328 may include the starter motor/generator of the gas turbine engine 100.

Referring still to FIG. 4, the gas turbine engine 100 further includes a sensor 330. In the embodiment shown, the sensor 330 is configured to sense data indicative of a flame within the combustion section 114 of the gas turbine engine 100. The sensor 330 may be, for example, a temperature sensor configured to sense data indicative of an exit temperature of the combustion section 114, an inlet temperature of the turbine section, an exhaust gas temperature, or a combination thereof. Additionally, or alternatively, the sensor 330 may be any other suitable sensor, or any suitable combination of sensors, configured to sense one or more gas turbine engine operating conditions or parameters, including data indicative of a flame within the combustion section 114 of the gas turbine engine 100.

Moreover, as is further depicted schematically in FIG. 4, the propulsion system, an aircraft including the propulsion system, or both, includes the controller 240. For example, the controller 240 may be a standalone controller, a gas turbine engine controller (e.g., a full authority digital engine control, or FADEC, controller), an aircraft controller, supervisory controller for a propulsion system, a combination thereof, etc.

The controller 240 is operably connected to the various sensors, valves, etc. within at least one of the gas turbine engine 100, the fuel delivery system 146, and the fuel cell and combustor assembly 200. More specifically, for the exemplary aspect depicted, the controller 240 is operably connected to the air processing unit 306, the fuel processing unit 304, the power converter 236 (and/or power converter 238), the valves (e.g., air and fuel valves to fuel cell stacks discussed below) of axially distributed fuel cell stacks, the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302.

As will be appreciated from the description below, the controller 240 may be in wired or wireless communication with these components. In this manner, the controller 240 may receive data from a variety of inputs (including a supervisory controller 412 shown in FIG. 4, the gas turbine engine sensor 330 and the fuel cell sensor 302), may make control decisions, and may provide data (e.g., instructions) to a variety of output (including the valves of the compressor bleed system to control an airflow bleed from the compressor section, the airflow delivery system to direct the airflow bled from the compressor section, and the fuel delivery system 146 to direct the fuel flow within the gas turbine engine 100).

Referring particularly to the operation of the controller 240, in at least certain embodiments, the controller 240 can include one or more computing device(s) 332. The computing device(s) 332 can include one or more processor(s) 332A and one or more memory device(s) 332B. The one or more processor(s) 332A can include any suitable processing device, such as a microprocessor, microcontroller, integrated circuit, logic device, and/or other suitable processing device. The one or more memory device(s) 332B can include one or more computer-readable media, including, but not limited to, non-transitory computer-readable media, RAM, ROM, hard drives, flash drives, and/or other memory devices.

The one or more memory device(s) 332B can store information accessible by the one or more processor(s) 332A, including computer-readable instructions 332C that can be executed by the one or more processor(s) 332A. The instructions 332C can be any set of instructions that when executed by the one or more processor(s) 332A, cause the one or more processor(s) 332A to perform operations. In some embodiments, the instructions 332C can be executed by the one or more processor(s) 332A to cause the one or more processor(s) 332A to perform operations, such as any of the operations and functions for which the controller 240 and/or the computing device(s) 332 are configured, the operations for operating a propulsion system, as described herein, and/or any other operations or functions of the one or more computing device(s) 332. The instructions 332C can be software written in any suitable programming language or can be implemented in hardware.

Additionally, or alternatively, the instructions 332C can be executed in logically and/or virtually separate threads on processor(s) 332A. The memory device(s) 332B can further store data 332D that can be accessed by the processor(s) 332A. For example, the data 332D can include data indicative of power flows, data indicative of gas turbine engine 100/aircraft operating conditions, and/or any other data and/or information described herein.

The computing device(s) 332 also includes a network interface 332E configured to communicate, for example, with the other components of the gas turbine engine 100 (such as the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302), the aircraft incorporating the gas turbine engine 100, etc.

The network interface 332E can include any suitable components for interfacing with one or more network(s), including for example, transmitters, receivers, ports, controllers, antennas, and/or other suitable components. In such a manner, it will be appreciated that the network interface 332E may utilize any suitable combination of wired and wireless communications network(s).

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 5:
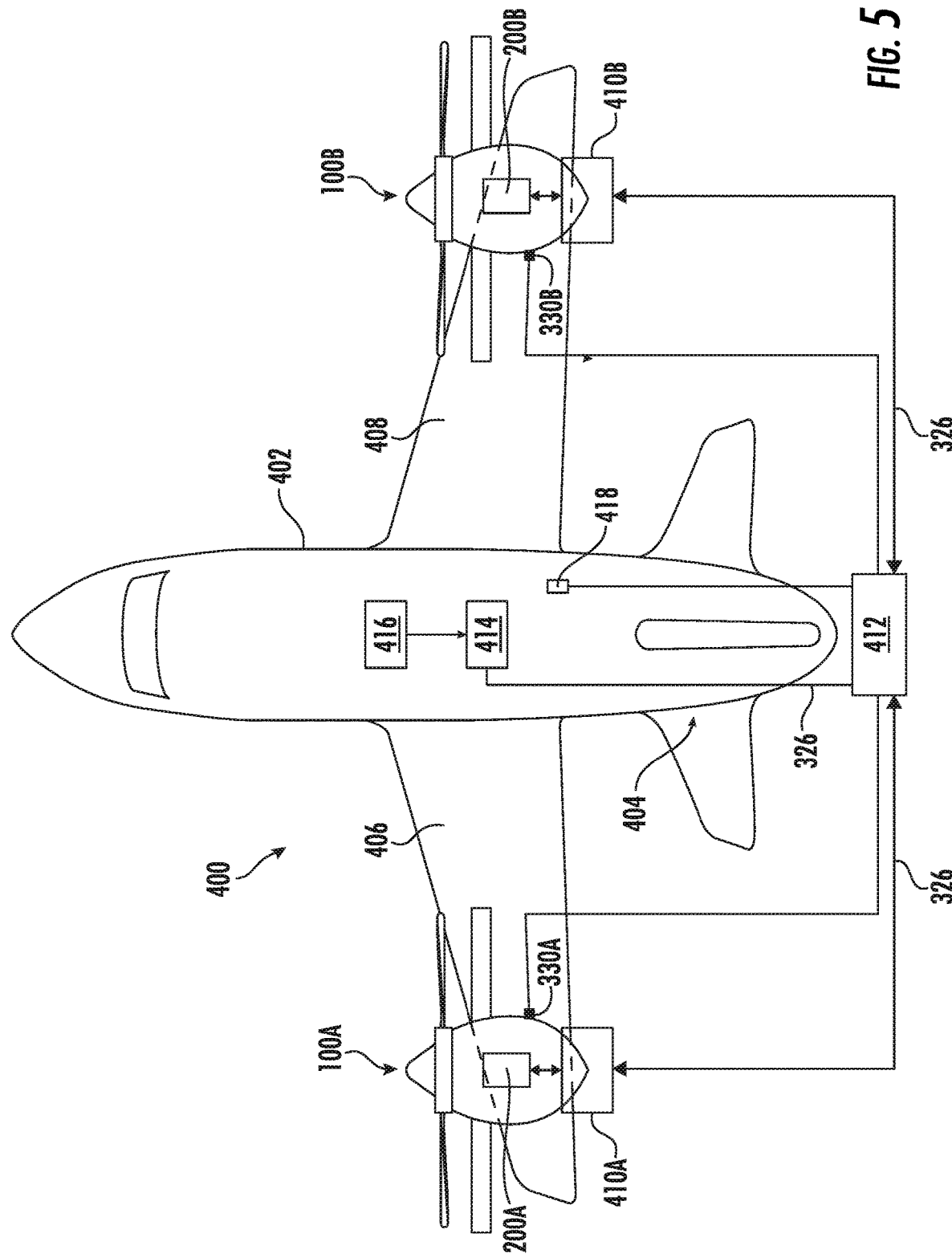
FIG. 5 is a schematic view of a vehicle and propulsion system in accordance with an exemplary aspect of the present disclosure.

As briefly mentioned above, the fuel cell assembly 204 may be in electrical communication with the electric bus 326, which may be an electric bus of the gas turbine engine 100, of an aircraft, or a combination thereof. Referring now briefly to FIG. 5, a schematic view is provided of an aircraft 400 in accordance with an embodiment of the present disclosure including one or more gas turbine engines 100 (labeled 100A and 100B), each with an integrated fuel cell and combustor assembly 200 (labeled 200A and 200B), and an aircraft electric bus 326 in electrical communication with the one or more gas turbine engines 100.

For the exemplary embodiment depicted, the aircraft 400 includes a fuselage 402, an empennage 404, a first wing 406, a second wing 408, and a propulsion system. The propulsion system generally includes a first gas turbine engine 100A coupled to, or integrated with, the first wing 406 and a second gas turbine engine 100B coupled to, or integrated with, the second wing 408. It will be appreciated, however, that in other embodiments, any other suitable number and or configuration of gas turbine engines 100 may be provided (e.g., fuselage-mounted, empennage-mounted, etc.).

The first gas turbine engine 100A generally includes a first integrated fuel cell and combustor assembly 200A and a first electric machine 410A. The first integrated fuel cell and combustor assembly 200A may generally include a first fuel cell assembly. The first electric machine 410A may be an embedded electric machine, an offset electric machine (e.g., rotatable with the gas turbine engine 100 through an accessory gearbox or suitable geartrain), etc. For example, in certain exemplary embodiments, the first electric machine 410A may be a starter motor/generator for the first gas turbine engine 100A.

Similarly, the second gas turbine engine 100B generally includes a second integrated fuel cell and combustor assembly 200B and a second electric machine 410B. The second integrated fuel cell and combustor assembly 200B may generally include a second fuel cell assembly. The second electric machine 410B may also be an embedded electric machine, an offset electric machine (e.g., rotatable with the gas turbine engine 100 through an accessory gearbox or suitable geartrain), etc. For example, in certain exemplary embodiments, the second electric machine 410B may be a starter motor/generator for the second gas turbine engine 100B.

In the embodiment of FIG. 5, the aircraft 400 additionally includes the electric bus 326 and a supervisory controller 412. Further, it will be appreciated that the aircraft 400 and/or propulsion system includes one or more electric devices 414 and an electric energy storage unit 416, each in electric communication with the electric bus 326. The electric devices 414 may represent one or more aircraft power loads (e.g., avionics systems, control systems, electric propulsors, etc.), one or more electric power sources (e.g., an auxiliary power unit), etc. The electric energy storage unit 416 may be, e.g., a battery pack or the like for storing electric power.

The electric bus 326 further electrically connects to the first electric machine 410A and first fuel cell assembly, as well as to the second electric machine 410B and second fuel cell assembly. The supervisory controller 412 may be configured in a similar manner as the controller 240 of FIG. 4 or may be in operative communication with a first gas turbine engine controller dedicated to the first gas turbine engine 100A and a second gas turbine engine controller dedicated to the second gas turbine engine 100B.

In such a manner, it will be appreciated that the supervisory controller 412 may be configured to receive data from a gas turbine engine sensor 330A of the first gas turbine engine 100A and from a gas turbine engine sensor 330B of the second gas turbine engine 100B, and may further be configured to send data (e.g., commands) to various control elements (such as valves) of the first and second gas turbine engines 100A, 100B.

Moreover, it will be appreciated that for the embodiment depicted, the aircraft 400 includes one or more aircraft sensor(s) 418 configured to sense data indicative of various flight operations of the aircraft 400, including, e.g., altitude, ambient temperature, ambient pressure, airflow speed, etc. The supervisory controller 412 is operably connected to these aircraft sensor(s) 418 to receive data from such aircraft sensor(s) 418.

In addition to receiving data from sensors 330A, 330B, 418 and sending data to control elements, the supervisory controller 412 is configured to control a flow of electric power through the electric bus 326. For example, the supervisory controller 412 may be configured to command and receive a desired power extraction from one or more of the electric machines (e.g., the first electric machine 410A and second electric machine 410B), one or more of the fuel cell assemblies (e.g., the first fuel cell assembly and second fuel cell assembly), or both, and provide all or a portion of the extracted electric power to other of the one or more of the electric machines (e.g., the first electric machine 410A and second electric machine 410B), one or more of the fuel cell assemblies (e.g., the first fuel cell assembly and second fuel cell assembly), or both. One or more of these actions may be taken in accordance with the logic outlined below.

Figure 6:
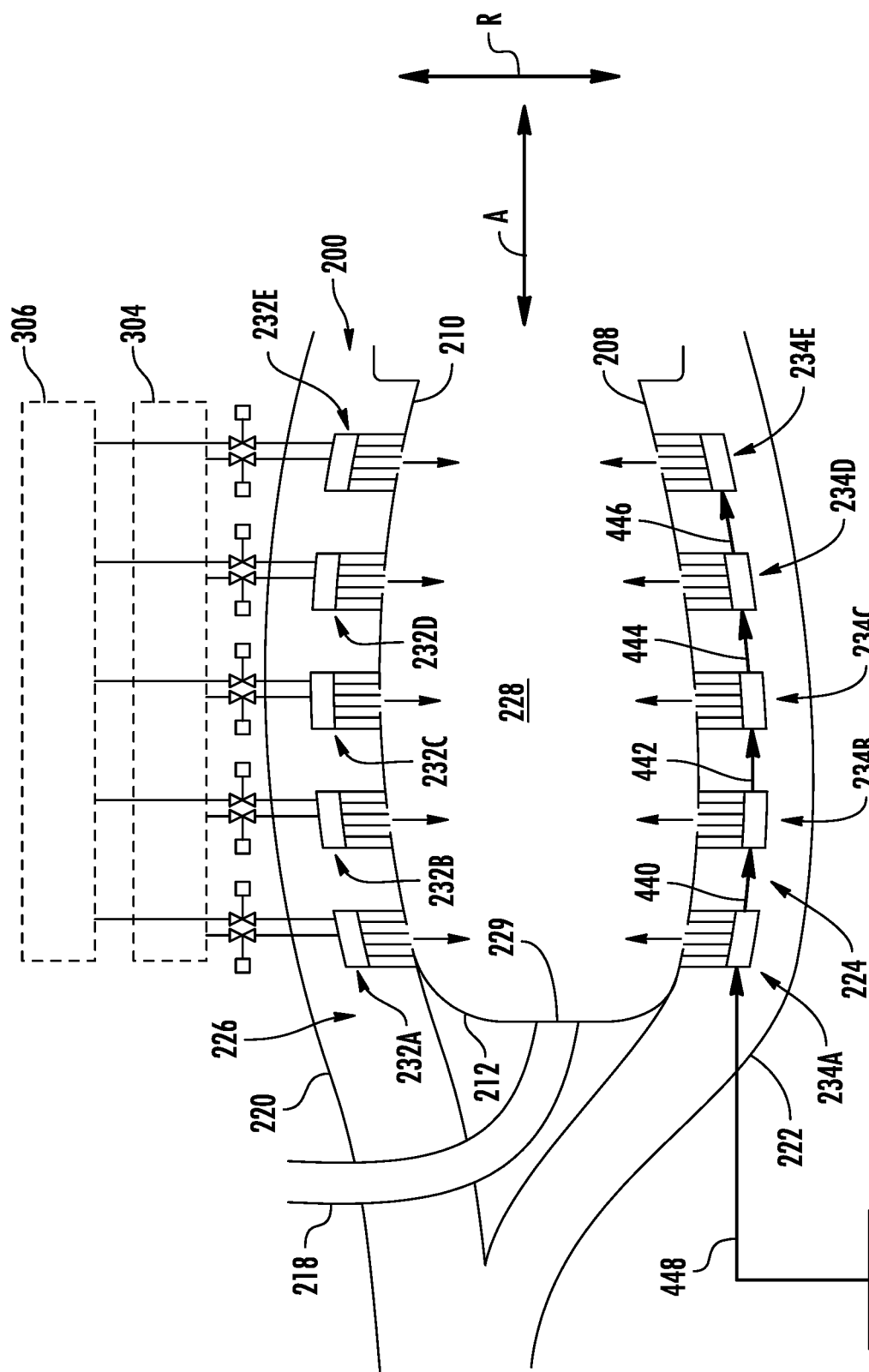
FIG. 6 is cross sectional view of an integrated fuel cell and combustor assembly in accordance with an exemplary aspect of the present disclosure.
Figure 7:
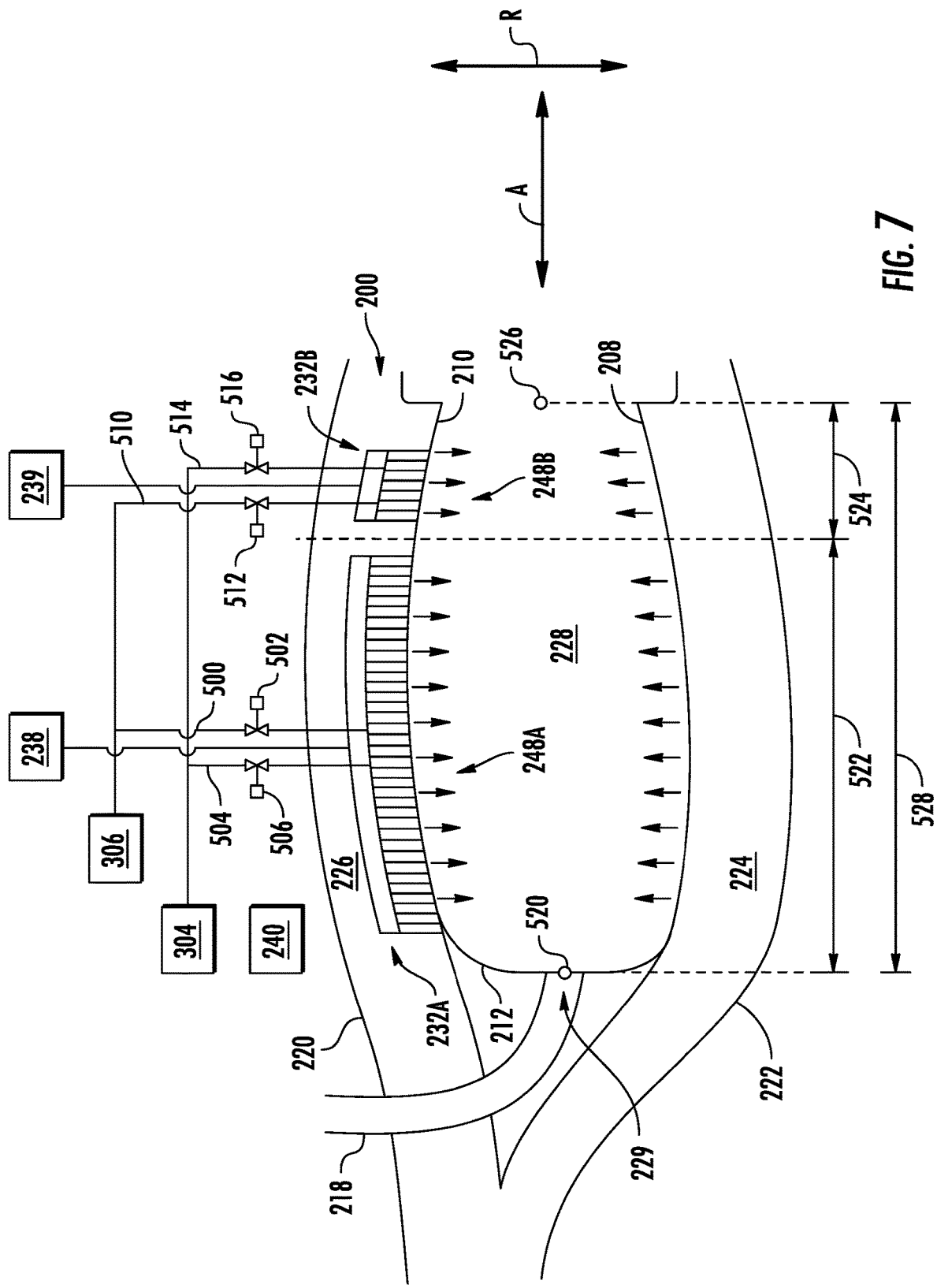
FIG. 7 is cross sectional view of an integrated fuel cell and combustor assembly in accordance with an exemplary aspect of the present disclosure.

Referring to FIGS. 6 and 7, integrated fuel cell and combustor assemblies 200 in accordance with two exemplary embodiments of the present disclosure will be described.

Referring first particularly to FIG. 6, a plurality of fuel cell stacks 232 are extended around the outer liner 210 defining the combustion chamber 228 or are integrated into the outer liner 210 defining the combustion chamber 228. The plurality of fuel cell stacks 232 are distributed along the axial direction A and independently receive air 244 from the air processing unit 306 and fuel 246 from the fuel processing unit 304.

In FIG. 6, a first fuel cell stack 232A of the plurality of fuel cell stacks 232 is connected to the air processing unit 306 by a first air line including a valve and is connected to the fuel processing unit 304 by a first fuel line including a valve; a second fuel cell stack 232B of the plurality of fuel cell stacks 232 is connected to the air processing unit 306 by a second air line including a valve and is connected to the fuel processing unit 304 by a second fuel line including a valve; a third fuel cell stack 232C of the plurality of fuel cell stacks 232 is connected to the air processing unit 306 by a third air line including a valve and is connected to the fuel processing unit 304 by a third fuel line including a valve; a fourth fuel cell stack 232D of the plurality of fuel cell stacks 232 is connected to the air processing unit 306 by a fourth air line including a valve and is connected to the fuel processing unit 304 by a fourth fuel line including a valve; and a fifth fuel cell stack 232E of the plurality of fuel cell stacks 232 is connected to the air processing unit 306 by a fifth air line including a valve and is connected to the fuel processing unit 304 by a fifth fuel line including a valve. In this embodiment, the individual air lines, fuel lines, and valves are not labeled for clarity.

As the fuel and air flow (e.g., flowrate) to the fuel cell stacks 232A, 232B, 232C, 232D, 232E are independently controllable (e.g., by controller 240, not shown, which may be operably coupled to the individual valves), the output products 248 (not labeled in FIG. 6) from the fuel cell stacks 232A, 232B, 232C, 232D, 232E along the axial length of the combustor 206 is configured to be controlled to achieve an axial temperature distribution, to reduce emissions through "late lean" methods, etc. For example, the fuel cell stacks 232A, 232B, 232C, 232D, 232E may be independently controllable to control a volume and composition (e.g., % Hz) of the output products 248 along the axial length of the combustor 206 within the combustion chamber 228 to influence the axial temperature distribution therein, to reduce emissions through "late lean" combustion methods.

The axially distributed plurality of fuel stacks 232 are configured to achieve at least one of late lean injection and a desired combustor gas concentration distribution. For example, the gas concentration distribution may be along the axial direction, along the circumferential direction, or a combination of both.

The controlled gas composition distribution may include an emission indicator including at least one of CO, carbon dioxide ($CO_2$), water vapor ($H_2O$), unburned hydrocarbons (UHC), particulate matter (e.g., mainly carbon), $NO_x$, and excess atmospheric oxygen and nitrogen.

It will be appreciated that in the embodiment depicted, each of the fuel cell stacks 232A, 232B, 232C, 232D, 232E is configured to receive air flow from the same air processing unit 306 and fuel flow by the same fuel processing unit 304. In alternative exemplary embodiments, however, the fuel cell system shown may include more than one air processing unit 306, more than one fuel processing unit 304, or both. In such an exemplary embodiment, the fuel cell system may be configured to provide air flow to one of the fuel cell stacks 232A, 232B, 232C, 232D, 232E at a higher or lower temperature, pressure, flowrate, or a combination thereof as compared to the other fuel cell stacks 232A, 232B, 232C, 232D, 232E; may be configured to provide fuel flow to one of the fuel cell stacks 232A, 232B, 232C, 232D, 232E at a higher or lower temperature, pressure, flowrate, or a combination thereof as compared to the other fuel cell stacks 232A, 232B, 232C, 232D, 232E. Such may facilitate a greater level of control of the axial temperature distribution through the combustion chamber 228.

Although spacing is provided between the fuel cell stacks 232A, 232B, 232C, 232D, 232E for purposes of illustration, the fuel cell stacks 232A, 232B, 232C, 232D, 232E may fully cover the liner of the combustion chamber 228 along the length of the combustor 206 in the axial direction A.

In alternative embodiments described in further detail below, different fuel cell stacks 232 may extend along different lengths in the axial direction A. In some embodiments, the fuel cell stacks 232 partially cover the liner 208, 210 defining the combustion chamber 228 along the length of the combustor 206 in the axial direction A.

In alternative embodiments described in further detail below, different fuel cell stacks 232 may have different sizes (represented by a height in the radial direction R). Here, the size of the fuel cell stack 232 corresponds generally to a greater potential to generate electric power for a given number of individual fuel cells and fuel cell stacks, as well as a greater potential flowrate of output products 248 therethrough to the combustion chamber 228.

Referring still to FIG. 6, the exemplary fuel cell system depicted further includes a plurality of fuel cell stacks 234A, 234B, 234C, 234D, 234E.

Here, however, the plurality of fuel cell stacks 234A, 234B, 234C, 234D, 234E are extended around the outer casing 220 of the combustor 206 or are integrated into the inner lining 208 of the combustor 206. The plurality of fuel cell stacks 234A, 234B, 234C, 234D, 234E are distributed along the axial direction A and are connected one to the next in a cascading arrangement (e.g., a series flow arrangement) by connections 440, 442, 444, 446. Here, fuel 246 (FIG. 3) from the fuel processing unit 304 (and/or air 244 (FIG. 3) from the air processing unit 306) received at one of the fuel cell stacks 234 of the plurality of fuel cell stacks 234A, 234B, 234C, 234D, 234E (first fuel cell stack 234A in the embodiment of FIG. 6) is configured to be provided to another one of the fuel cell stacks 234 (the remaining fuel cell stacks 234B, 234C, 234D, 234E in the embodiment of FIG. 6) via the connections 440, 442, 444, 446.

The connections may be configured to control the flow from one fuel cell stack 232 to the next. For example, a size of a channel of each of the connections 440, 442, 444, 446 may be decreased to reduce an amount of flow through the channel. In addition, the connections 440, 442, 444, 446 may include valves that are configured to be controlled to control flow from one fuel cell stack 232 to the next.

In FIG. 6, a first fuel cell stack 234A is connected to the fuel processing unit 304 by a first fuel flowline 448; a second fuel cell stack 234B is connected to the first fuel cell stack 234A by the connection 440; a third fuel cell stack 234C is connected to the second fuel cell stack 234B by the connection 442; a fourth fuel cell stack 234D is connected to the third fuel cell stack 234C by the connection 444; and a fifth fuel cell stack 234E is connected to the fourth fuel cell stack 234D by the connection 446.

For example, the channels 247 (FIG. 3) of the fuel cell stacks 234 (see also FIG. 3) may be connected by connections 440, 442, 444, 446.

Although not depicted, it will be appreciated that in at least certain exemplary embodiments, the fuel cell system may similarly be configured to provide air flow to the plurality of fuel cell stacks 234A, 234B, 234C, 234D, 234E in a similar cascading manner.

It will be appreciated that such a configuration provides for control and distribution of output products 248 (FIG. 3) from the plurality of fuel cell stacks 234A, 234B, 234C, 234D, 234E along the length of the combustor 206 in the axial direction A.

Referring now particularly to FIG. 7, a plurality of fuel cell stacks 232A, 232B are extended around the outer liner 210 defining the combustion chamber 228 or are integrated into the outer liner 210 defining the combustion chamber 228. The plurality of fuel cell stacks 232 are distributed along the axial direction A and independently receive air 244 (FIG. 3) from the air processing unit 306 and fuel 246 (FIG. 3) from the fuel processing unit 304.

In the exemplary embodiment of FIG. 7, a first fuel cell stack 232A of the plurality of fuel cell stacks 232 is connected to the air processing unit 306 by a first air flowline 500 including a valve 502 and is connected to the fuel processing unit 304 by a first fuel flowline 504 including a valve 506; and a second fuel cell stack 232B of the plurality of fuel cell stacks 232 is connected to the air processing unit 306 by a second air flowline 510 including a valve 512 and is connected to the fuel processing unit 304 by a second fuel flowline 514 including a valve 516.

Here, the first fuel cell stack 232A covers a greater length of the outer liner 210 defining the combustion chamber 228 in the axial direction A than that covered by the second fuel cell stack 232B. More specifically, the first fuel cell stack 232A has a greater length in the axial direction A than the second fuel cell stack 232B.

For example, a length of the first fuel cell stack 232A may be at least about 5% greater than a length of the second fuel cell stack 232B along the axial direction A, such as at least about 10% greater, such as at least about 20% greater, such as at least about 25% greater, such as at least about 40% greater, such as at least about 60% greater, such as up to about 1,000% greater.

Further, for the embodiment depicted, the first fuel cell stack 232A is upstream of second fuel cell stack 232B and second fuel cell stack 232B is positioned at, adjacent to, proximate to, closer to, etc. a downstream end 526 of the combustion chamber 228 in the axial direction A (i.e., a downstream-most location of the combustion chamber 228 along the axial direction A). For example, an upstream end of second fuel cell stack 232B is spaced apart from an upstream end 520 of the combustion chamber 228 (i.e., an upstream-most location of the combustion chamber 228 along the axial direction A, e.g., at a dome 212 or an opening 229) by a distance 522. The second fuel cell stack 232B provides output products 248 to the combustion chamber 228 downstream of the distance 522 (e.g., at a downstream section 524 of the combustion chamber 228 or adjacent the downstream end 526). A length 528 of the combustion chamber 228 in the axial direction A may be measured between the upstream end 520 and the downstream end 526.

As the fuel and air flow (e.g., flowrate) to the fuel cell stacks 232A, 232B are independently controlled by controller 240, output products 248A, 248B from respective fuel cell stacks 232A, 232B along the length 528 of the combustor 206 may be controlled to achieve an axial temperature distribution, to reduce emissions through "late lean" combustion methods, etc.

For example, the controller 240 may increase the fuel flowrate to the second fuel cell stack 232B, relative to the fuel flowrate to the first fuel cell stack 232A (e.g., as represented by longer output product 248 "arrows"), to modify a composition of the output products 248, e.g., increase a % $H_2$ in the output products, resulting in an increase in downstream, secondary combustion in the combustion chamber. Such a distribution or composition of output products 248 may provide for a more complete combustion of the combustion gasses generated within the combustion chamber 228 and a reduction in certain emissions, such as NON.

Additionally or alternatively, the controller 240 may control one or both of the power converters 238, 239 to increase the current drawn from the second fuel cell stack 232B. By increasing current in the downstream fuel cell stack 232B, the fuel cell offgas injected into the combustor 206 downstream tends to have less remaining fuel than that of the fuel cell offgas injected into the combustor 206 upstream. Given the same amount of air flowrate to both first and second fuel cell stacks 232A, 232B, this approach generates a higher air/fuel ratio (or lean burn) at the downstream end of combustor 206.

The controller 240 is configured to control the valves 506, 516 collaboratively with the power converters 238, 239 to achieve a desired combustor gas composition distribution.

The controller 240 is configured to control the valves 506, 516 collaboratively to achieve a desired combustor gas temperature distribution.

The controller 240 is configured to control the valves 506, 516 collaboratively to achieve a desired combustor gas pressure distribution.

Additionally, or alternatively, a temperature of the output products 248B from the second fuel cell stack 232B may be increased to provide the desired effect on the emissions within the combustion gasses generated within the combustion chamber 228. For example, higher temperature airflow may be provided to the second fuel cell stack 232B to increase the temperature of the output products 248B therefrom.

It will be appreciated that as noted above with respect to FIG. 6, although each of the fuel cell stacks 232A, 232B depicted in FIG. 7 is configured to receive air flow from the same air processing unit 306 and fuel flow by the same fuel processing unit 304, in alternatively exemplary embodiments, the fuel cell system shown may include more than one air processing unit 306, more than one fuel processing unit 304, or both.

Further, it will be appreciated that although for the embodiment of FIG. 7 the first fuel cell stack 232A (the upstream fuel cell stack) has a longer axial dimension than the second fuel cell stack 232B (the downstream fuel cell stack), in other exemplary embodiments, such a configuration may be reversed, such that the downstream fuel cell stack has a longer axial dimension than the upstream fuel cell stack.

The distance 522 to the downstream section 524 may be at least 30% of the length 528 of the combustion chamber 228. For example, in certain exemplary embodiments, the distance 522 may be greater than or equal to half of the length 528 of the combustion chamber 228 in the axial direction A. For example, the distance 522 to the downstream section 524 may be at least two thirds, at least three fifths, or at least four sevenths of the length 528 of the combustion chamber 228 in the axial direction A. Such a configuration may ensure that the second fuel cell stack 232B is positioned to provide a desired amount of secondary, downstream combustion/heat addition to the combustion gasses within the combustion chamber 228 to affect an amount of undesired constituents in combustion gasses, such as NON.

Figure 8:
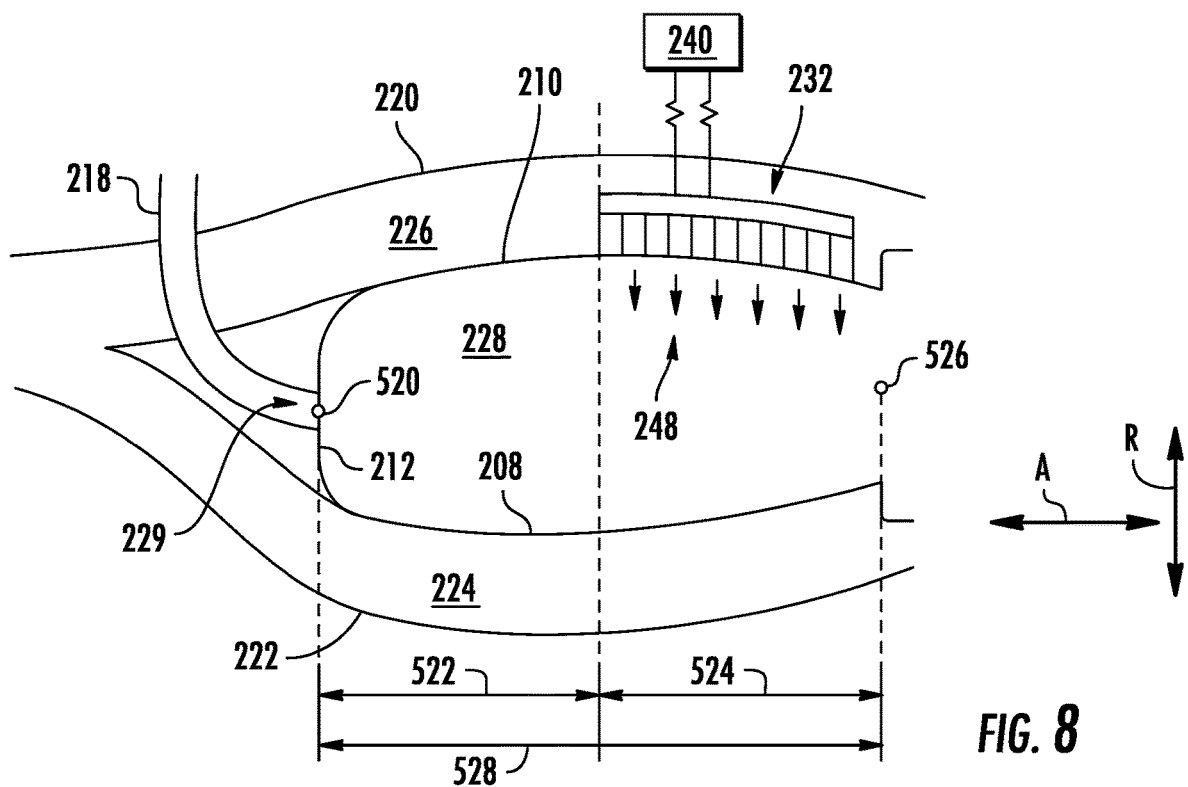
FIG. 8 is cross sectional view of an integrated fuel cell and combustor assembly in accordance with an exemplary aspect of the present disclosure.

Referring now to FIG. 8, an integrated fuel cell and combustor assembly 200 in accordance with an additional exemplary embodiment of the present disclosure will be described.

The exemplary integrated fuel cell and combustor assembly 200 of FIG. 8 may be configured in a similar manner as the exemplary integrated fuel cell and combustor assembly 200 of FIG. 7. For example, the exemplary integrated fuel cell and combustor assembly 200 of FIG. 8 includes a fuel cell stack 232 extended around the outer liner 210 defining the combustion chamber 228 or integrated into the outer liner 210 defining the combustion chamber 228. The fuel cell stack 232 may receive air 244 from an air processing unit 306 and fuel 246 from a fuel processing unit 304 (not shown in FIG. 8).

The fuel cell stack 232 is positioned at, adjacent to, proximate to, closer to, etc. a downstream end 526 of the combustion chamber 228 in the axial direction A. An upstream end of fuel cell stack 232 is spaced apart from an upstream end 520 of the combustion chamber 228 (e.g., dome 212 or opening 229) by a distance 522.

Here, the fuel cell stack 232 is a forward-most fuel cell stack 232.

In this embodiment, the distance 522 represents a distance between an upstream location (e.g., the upstream end 520 in the embodiment depicted) where fuel is first provided to the combustion chamber 228 through the opening 229 and a downstream location where fuel or output products are next provided to the combustion chamber 228. The fuel cell stack 232 provides output products 248 to the combustion chamber 228 downstream of the distance 522 (e.g., at a downstream section 524 of the combustion chamber 228 or adjacent a downstream end 526). A length 528 of the combustion chamber 228 may be measured in the axial direction A between the upstream end 520 and the downstream end 526.

The distance 522 may be similar to the distance 522 described above with respect to FIG. 7. For example, the distance 522 to the downstream section 524 may be at least 30% of the length 528 of the combustion chamber 228. In certain exemplary embodiments, the distance 522 may be greater than or equal to half of the length 528 of the combustion chamber 228 in the axial direction A. For example, the distance 522 to the downstream section 524 may be at least two thirds, at least three fifths, or at least four sevenths of the length 528 of the combustion chamber 228 in the axial direction A.

The distance 522 to the downstream section 524 may be greater than or equal to half of the length 528 of the combustion chamber 228 in the axial direction A. For example, the distance 522 to the downstream section 524 may be two thirds, three fifths, four sevenths, etc. of the length 528 of the combustion chamber 228 in the axial direction A.

Output products 248 from the fuel cell stack 232 along a portion of the length of the combustor 206 in the axial direction A may be utilized to achieve a desired axial temperature distribution, and in particular, within the downstream section 524. Such a configuration may reduce emissions through "late lean" combustion methods. For example, with less than 100% fuel utilization within the fuel cell stack 232, the output products 248 will include hydrogen gas ($H_2$), which may facilitate a secondary, downstream combustion within the combustion chamber 228, potentially providing for a more complete combustion of the combustion gasses flowing therethrough.

Additionally, it will be appreciated that the output products 248 may be provided at a relatively high temperature to the combustion chamber 228 and may further include oxygen. The high temperatures of the output products 248 and the oxygen content of the output products 248 may similarly facilitate more complete combustion of the combustion gasses flowing through the combustion chamber 228. The above effects may potentially reduce undesired constituents (e.g., NON) within the combustion gasses from the combustion chamber.

In certain exemplary embodiments, a controller 240 may modify the fuel flowrate to the fuel cell stack 232, the air flowrate to the fuel cell stack 232, a temperature of the air provided to the fuel cell stack 232, an electric current drawn from the fuel cell stack 232, or a combination thereof to modify a composition, a temperature, a flowrate, or a combination thereof of the output products 248 provided to the combustion chamber 228 to, e.g., facilitate a more complete combustion of the combustion gasses within the combustion chamber 228 proximate or within the downstream section 524 of the combustion chamber 228.

According to an exemplary method, a flow of aviation fuel is provided to the combustion chamber 228 of the combustor 206 through the opening 229 defined at the upstream end 520 of the combustion chamber 228 to initiate an initial combustion within the combustion chamber 228. In addition, the flow of output products 248 are provided from the fuel cell stack 232 to the combustion chamber 228 at a downstream section 524 of the combustion chamber 228 to initiate a secondary combustion within the combustion chamber 228 at a location downstream of the initial combustion within the combustion chamber 228.

Figure 9:
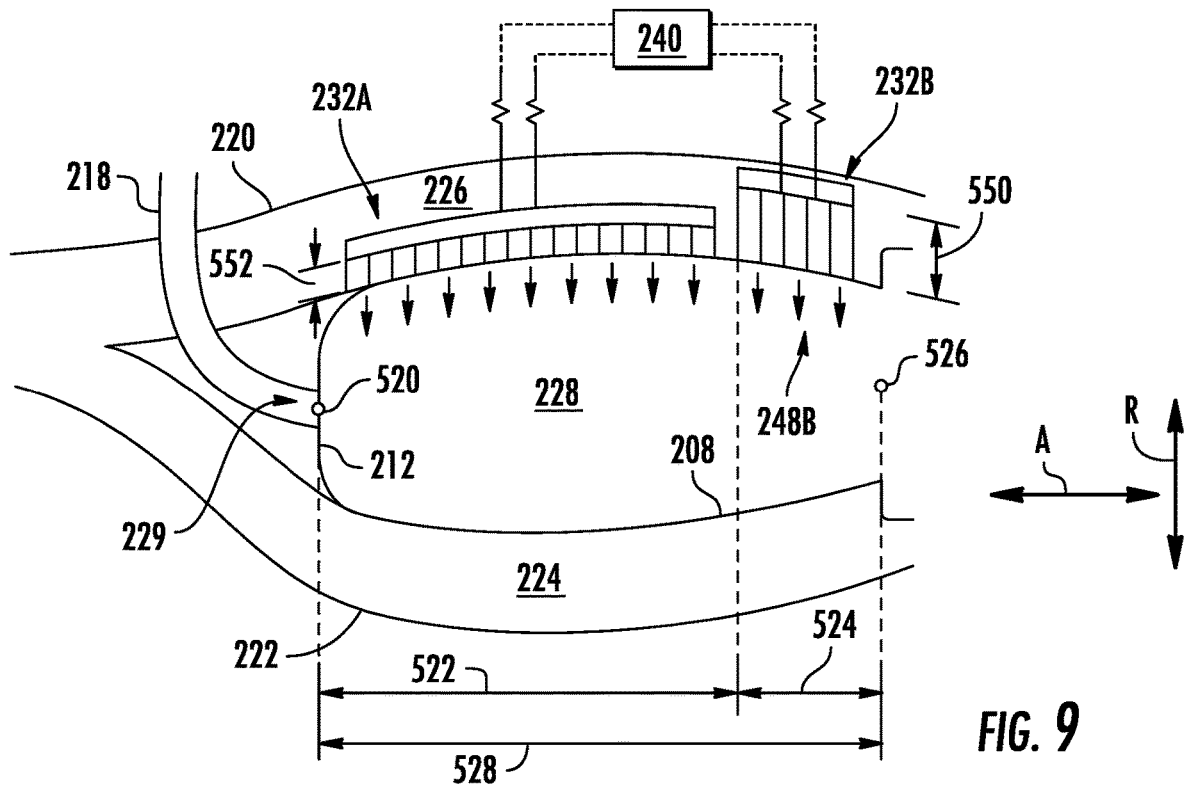
FIG. 9 is cross sectional view of an integrated fuel cell and combustor assembly in accordance with an exemplary aspect of the present disclosure.

Referring now to FIG. 9, an integrated fuel cell and combustor assembly 200 in accordance with an additional exemplary embodiment of the present disclosure will be described.

The exemplary integrated fuel cell and combustor assembly 200 of FIG. 9 may be configured in a similar manner as the exemplary integrated fuel cell and combustor assembly 200 of FIG. 7. For example, the exemplary integrated fuel cell and combustor assembly 200 FIG. 9 includes fuel cell stacks 232 extended around an outer liner 210 defining a combustion chamber 228 or integrated into the outer liner 210 defining the combustion chamber 228. The fuel cell stacks 232 may receive air 244 from an air processing unit 306 and fuel 246 from a fuel processing unit 304 (not shown in FIG. 9).

The fuel cell stacks 232 of FIG. 9 include a first fuel cell stack 232A positioned at, adjacent to, proximate to, closer to, etc. an upstream end 520 of the combustion chamber 228 in the axial direction A and a second fuel cell stack 232B positioned at, adjacent to, proximate to, closer to, etc. a downstream end 526 of the combustion chamber 228 in the axial direction A. An upstream end of the second fuel cell stack 232B is spaced apart from the upstream end 520 of the combustion chamber 228 (e.g., dome 212 or opening 229) by a distance 522.

The first fuel cell stack 232A provides output products 248A to the combustion chamber 228 upstream of the distance 522 and the second fuel cell stack 232B provides output products 248B to the combustion chamber 228 downstream of the distance 522 (e.g., at a downstream section 524 of the combustion chamber 228 or adjacent a downstream end 526). A length 528 of the combustion chamber 228 may be measured between the upstream end 520 and the downstream end 526.

In addition, the size (e.g., height 550 in the radial direction R) of the second fuel cell stack 232B is greater than the size (e.g., height 552 in the radial direction R) of the first fuel cell stack 232A. For example, the height 550 is 1.1 to 2 times the height 552. In certain embodiments, greater height in the radial direction may be achieved by stacking fuel cells end to end in the radial direction R, or by simply using longer fuel cells.

The greater height may allow for the second fuel cell stack 232B to generate more electrical power for a given number of fuel cells. Additionally or alternatively, the greater height may allow for the second fuel cell stack 232B to provide output products 248B to the combustion chamber 228 proximate the downstream end 526 in a manner to better facilitate more complete combustion and therefore less emissions.

For example, the controller 240 controls a power converter 236 (FIG. 2) to increase or decrease a current (I) drawn from the second fuel cell stack 232B and controls valves to control amounts of fuel and amounts, pressures, and temperatures of air provided to the second fuel cell stack 232B to, in turn, control aspects of the output products 248B provided at the downstream section 524 of the combustion chamber 228.

In at least certain exemplary aspects, an increase in current (I) drawn by the power converter 236 may result in more hydrogen being consumed (e.g., converted to electricity) in the second fuel cell stack 232B and less fuel from the second fuel cell stack 232B exhausting into the combustion chamber 228. Accordingly, the second fuel cell stack 232B may provide less combustible gas into the combustion chamber 228, which may act as a vaporizer to reduce nitrogen oxides (NON). A stream of less combustible gas may be referred to as a high-purity stream. The high-purity stream quenches the NON reactions. NON decreases exponentially with increasing water or steam injection or increasing specific humidity.

In addition, providing output products at the downstream section 524 (late lean) reduces the residence time of the output products and therefore lowers NON.

In other exemplary aspects, for a desired total heat input for the integrated fuel cell and combustor assembly 200, less aircraft fuel may be provided to the combustor 206 (FIG. 4) through a combustor nozzle at the upstream end 520 of the combustion chamber. With such a configuration, less current may be drawn from the second fuel cell stack 232B for given flow of air and fuel, such that the output products 248B provided proximate the downstream end 526 contain a higher amount of combustible gas, e.g., Hz, allowing for lower peak temperatures within the combustion chamber 228 and therefore resulting in less NON formation.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A propulsion system for an aircraft, the aircraft comprising an aircraft fuel supply, the propulsion system comprising: a turbomachine defining an axial direction and comprising a compressor section, a combustor, and a turbine section arranged in serial flow order, the combustor defining a combustion chamber and an opening at an upstream end of the combustion chamber, the combustor configured to receive a flow of aviation fuel from the aircraft fuel supply through the opening; and a plurality of fuel cell stacks extended around the combustion chamber, each fuel cell stack of the plurality of fuel cell stacks being configured to provide output products to the combustion chamber to achieve at least one of late lean injection and a desired combustor gas concentration distribution, the plurality of fuel cell stacks distributed along a length of the combustion chamber in the axial direction.

The propulsion system of one or more of these clauses, wherein the combustor includes an outer liner defining at least in part the combustion chamber, wherein the plurality of fuel cell stacks are extended around or integrated into the outer liner.

The propulsion system of one or more of these clauses, wherein the combustor includes an inner liner defining at least in part the combustion chamber, wherein the plurality of fuel cell stacks are extended around or integrated into the inner liner.

The propulsions system of one or more of these clauses, wherein the plurality of fuel cell stacks have independent fuel inputs that are independently controlled.

The propulsion system of one or more of these clauses, wherein the plurality of fuel cell stacks are connected one to the next in a series flow arrangement.

The propulsion system of one or more of these clauses, wherein the plurality of fuel cell stacks comprises a first fuel cell stack and a second fuel cell stack, wherein the second fuel cell stack is positioned upstream of the first fuel cell stack.

The propulsion system of one or more of these clauses, wherein the first fuel cell stack includes a first fuel cell defining a first height in a radial direction, wherein the second fuel cell stack includes a second fuel cell defining a second height in the radial direction, and wherein the first height is greater than the second height.

The propulsion system of one or more of these clauses, wherein the first fuel cell stack defines a first length in the axial direction, wherein the second fuel cell stack defines a second length in the axial direction, and wherein the first length is different than the second length.

The propulsion system of one or more of these clauses, wherein the first fuel cell stack is configured to generate more current from a flow of fuel than the second fuel cell stack.

The propulsion system of one or more of these clauses, further comprising a first fuel line extending to the first fuel cell stack; and a second fuel line extending to the second fuel cell stack, wherein the first fuel line and the second fuel line are configured to be independently controlled.

The propulsion system of one or more of these clauses, wherein the first fuel line comprises a first valve and wherein the second fuel line comprises a second valve.

The propulsion system of one or more of these clauses, further comprising a controller, wherein the controller is configured to control the first valve and the second valve independently or collaboratively to achieve a desired combustor gas composition distribution.

The propulsion system of one or more of these clauses, further comprising a controller, wherein the controller is configured to control the first valve and the second valve collaboratively with a first power converter and a second power converter to achieve a desired combustor gas composition distribution.

The propulsion system of one or more of these clauses, wherein the controlled combustor gas composition distribution is along at least one of a combustor axial direction and a combustor circumferential direction.

The propulsion system of one or more of these clauses, wherein the controlled combustor gas composition distribution may include an emission indicator including carbon monoxide, carbon dioxide, water vapor, unburned hydrocarbons, particulate matter, $NO_x$, and excess atmospheric oxygen and nitrogen.

The propulsion system of one or more of these clauses, further comprising a controller, wherein the controller is configured to control the first valve and the second valve independently or collaboratively to achieve a desired combustor gas temperature distribution.

The propulsion system of one or more of these clauses, wherein the controlled combustor gas temperature distribution is along at least one of a combustor axial direction and a combustor circumferential direction.

The propulsion system of one or more of these clauses, further comprising a controller, wherein the controller is configured to control the first valve and the second valve independently or collaboratively to achieve a desired combustor gas pressure distribution.

The propulsion system of one or more of these clauses, wherein the controlled combustor gas pressure distribution is along at least one of the axial direction and the circumferential direction of the combustor.

An assembly for late lean injection of fuel into a gas turbine combustor, comprising: a fuel and air premixing device configured to alter a fuel composition; a fuel and air conditioning device configured to further alter the fuel composition and generate electrical power; and a controller configured to control the fuel and air premixing device and the fuel and air conditioning device to achieve a desired gas composition distribution in a combustor along an axial direction of the combustor.

We claim:

1. A propulsion system for an aircraft, the aircraft comprising an aircraft fuel supply, the propulsion system comprising:
   a turbomachine defining an axial direction and comprising a compressor section, a combustor, and a turbine section arranged in serial flow order, the combustor defining a combustion chamber and an opening at an upstream end of the combustion chamber, the combustor configured to receive a flow of aviation fuel from the aircraft fuel supply through the opening; and
   a plurality of fuel cell stacks extended around the combustion chamber, each fuel cell stack of the plurality of fuel cell stacks having a separate channel that receives air and the aviation fuel being configured to provide output products to the combustion chamber to achieve at least one of late lean injection and a desired combustor gas concentration distribution, the plurality of fuel cell stacks distributed along a length of the combustion chamber in the axial direction;
   wherein the plurality of fuel cell stacks are separated by a gap that is different than a gap between adjacent fuel cells within each of the plurality of fuel cell stacks.

2. The propulsion system of claim 1, wherein the combustor includes an outer liner defining at least in part the combustion chamber, wherein the plurality of fuel cell stacks are extended around or integrated into the outer liner.

3. The propulsion system of claim 1, wherein the combustor includes an inner liner defining at least in part the combustion chamber, wherein the plurality of fuel cell stacks are extended around or integrated into the inner liner.

4. The propulsions system of claim 1, wherein the plurality of fuel cell stacks have independent fuel inputs that are independently controlled.

5. The propulsion system of claim 1, wherein the plurality of fuel cell stacks are connected one to the next in a series flow arrangement.

6. The propulsion system of claim 1, wherein the plurality of fuel cell stacks comprises a first fuel cell stack and a second fuel cell stack, wherein the second fuel cell stack is positioned upstream of the first fuel cell stack.

7. The propulsion system of claim 6, wherein the first fuel cell stack includes a first fuel cell defining a first height in a radial direction, wherein the second fuel cell stack includes a second fuel cell defining a second height in the radial direction, and wherein the first height is greater than the second height.

8. The propulsion system of claim 6, wherein the first fuel cell stack defines a first length in the axial direction, wherein the second fuel cell stack defines a second length in the axial direction, and wherein the first length is different than the second length.

9. The propulsion system of claim 6, wherein the first fuel cell stack is configured to generate more current from the flow of aviation fuel than the second fuel cell stack.

10. The propulsion system of claim 6, further comprising
    a first fuel line extending to the first fuel cell stack; and
    a second fuel line extending to the second fuel cell stack, wherein the first fuel line and the second fuel line are configured to be independently controlled.

11. The propulsion system of claim 10, wherein the first fuel line comprises a first valve and wherein the second fuel line comprises a second valve.

12. The propulsion system of claim 11, further comprising a controller, wherein the controller is configured to control the first valve and the second valve independently or collaboratively to achieve a controlled combustor gas composition distribution.

13. The propulsion system of claim 11, further comprising a controller, wherein the controller is configured to control the first valve and the second valve collaboratively with a first power converter and a second power converter to achieve a desired combustor gas composition distribution.

14. The propulsion system of claim 12, wherein the controlled combustor gas composition distribution is along at least one of a combustor axial direction and a combustor circumferential direction.

15. The propulsion system of claim 12, wherein the controlled combustor gas composition distribution includes an emission indicator including at least one of carbon monoxide, carbon dioxide, water vapor, unburned hydrocarbons, particulate matter, NOR, and excess atmospheric oxygen and nitrogen.

16. The propulsion system of claim 11, further comprising a controller, wherein the controller is configured to control the first valve and the second valve independently or collaboratively to achieve a desired combustor gas temperature distribution.

17. The propulsion system of claim 16, wherein the desired combustor gas temperature distribution is along at least one of a combustor axial direction and a combustor circumferential direction.

18. The propulsion system of claim 11, further comprising a controller, wherein the controller is configured to control the first valve and the second valve independently or collaboratively to achieve a desired combustor gas pressure distribution.

19. The propulsion system of claim 18, wherein the desired combustor gas pressure distribution is along at least one of the axial direction and the circumferential direction of the combustor.

20. An assembly for late lean injection of fuel into a gas turbine combustor, comprising:

a fuel and air premixing device configured to alter a fuel composition;

a fuel and air conditioning device configured to further alter the fuel composition and generate electrical power, the fuel and air conditioning device including a first fuel cell stack having a first channel to receive a first portion of air and a first portion of the fuel positioned upstream of a second fuel cell stack having a second channel to receive a second portion of air and a second portion of the fuel, wherein the first fuel cell stack is separated by a gap from the second fuel cell stack, the gap between the first fuel cell stack and the second fuel cell stack is different than a gap between adjacent fuel cells within each of the plurality of fuel cell stacks; and a controller configured to control the fuel and air premixing device and the fuel and air conditioning device to achieve a desired gas composition distribution in the gas turbine combustor along an axial direction of the gas turbine combustor.

* * * * *